United States Patent
Ishizuka et al.

(10) Patent No.: US 7,338,219 B2
(45) Date of Patent: Mar. 4, 2008

(54) RETRACTABLE LENS SYSTEM AND A CAMERA INCORPORATING THE RETRACTABLE LENS SYSTEM

(75) Inventors: Kazunori Ishizuka, Kanagawa (JP); Hiroshi Nomura, Saitama (JP)

(73) Assignee: PENTAX Corporation, Tokyo (JP)

(*) Notice: Subject to any disclaimer, the term of this patent is extended or adjusted under 35 U.S.C. 154(b) by 330 days.

(21) Appl. No.: 11/081,700

(22) Filed: Mar. 17, 2005

(65) Prior Publication Data

US 2005/0207748 A1  Sep. 22, 2005

(30) Foreign Application Priority Data

Mar. 18, 2004  (JP) ............................. 2004-079043

(51) Int. Cl.
 *G03B 17/04* (2006.01)
(52) U.S. Cl. ...................................... 396/349; 396/451
(58) Field of Classification Search ............ 396/73–75, 396/349, 350
 See application file for complete search history.

(56) References Cited

U.S. PATENT DOCUMENTS

| 3,377,427 A | 4/1968 | Fischer |
| 4,451,129 A | 5/1984 | Ikari et al. |
| 4,525,050 A | 6/1985 | Ohashi |
| 4,545,661 A | 10/1985 | Hamaguchi et al. |
| 4,597,657 A | 7/1986 | Wakabayashi et al. |
| 4,643,554 A | 2/1987 | Ogawa |
| 4,643,555 A | 2/1987 | Wakabayashi |
| 4,721,972 A | 1/1988 | Wakabayashi |
| 4,768,048 A | 8/1988 | Wakabayashi |
| 4,771,303 A | 9/1988 | Matsumoto et al. |
| 4,791,441 A | 12/1988 | Nishi |
| 4,792,822 A | 12/1988 | Akiyama et al. |
| 4,841,323 A | 6/1989 | Yamada et al. |
| 4,887,107 A | 12/1989 | Nakamura et al. |

(Continued)

FOREIGN PATENT DOCUMENTS

DE  3317999  11/1983

(Continued)

OTHER PUBLICATIONS

U.S. Appl. No. 10/646,724 to Nomura, filed Aug. 25, 2003.

(Continued)

*Primary Examiner*—W. B. Perkey
(74) *Attorney, Agent, or Firm*—Greenblum & Bernstein, P.L.C.

(57) ABSTRACT

A retractable lens system includes optical elements of a photographing optical system, and are positioned on a common optical axis when in a ready-to-photograph state. When the retractable lens system changes from the ready-to-photograph state to a retracted state, a removable optical element of the optical elements is moved to a removed position, and the removable optical element and an element of the remaining optical elements are moved rearward. The element of the remaining elements includes a linearly movable element which moves in the common optical axis direction without changing a distance between the linearly movable element and the removable optical element in the ready-to-photograph state. A part of the removable optical element and a part of the linearly movable element are positioned on a common plane perpendicular to the common optical axis when the retractable lens system changes from the ready-to-photograph state to the retracted state.

60 Claims, 11 Drawing Sheets

U.S. PATENT DOCUMENTS

| | | |
|---|---|---|
| 4,937,609 A | 6/1990 | Wakabayashi et al. |
| 4,952,955 A | 8/1990 | Iwata et al. |
| 4,974,949 A | 12/1990 | Tanaka |
| 4,993,815 A | 2/1991 | Yamazaki et al. |
| 5,086,312 A | 2/1992 | Tanaka et al. |
| 5,099,263 A | 3/1992 | Matsumoto et al. |
| 5,136,324 A | 8/1992 | Tsuboi et al. |
| 5,210,644 A | 5/1993 | Nomura |
| 5,223,873 A | 6/1993 | Tsuboi |
| 5,264,939 A | 11/1993 | Chang |
| 5,376,983 A | 12/1994 | Yamazaki et al. |
| 5,430,516 A | 7/1995 | Uziie et al. |
| 5,485,315 A | 1/1996 | Nomura et al. |
| 5,499,143 A | 3/1996 | Sakamoyo et al. |
| 5,548,446 A | 8/1996 | Enomoto |
| 5,587,754 A | 12/1996 | Katyama et al. |
| 5,636,062 A | 6/1997 | Okuyama et al. |
| 5,715,482 A | 2/1998 | Wakabayashi et al. |
| 5,731,913 A | 3/1998 | Imanari |
| 5,739,962 A | 4/1998 | Asakura et al. |
| 5,765,049 A | 6/1998 | Hase et al. |
| 5,790,907 A | 8/1998 | Reibl |
| 5,790,911 A | 8/1998 | Reibl |
| 5,818,647 A | 10/1998 | Nishio et al. |
| 5,832,326 A | 11/1998 | Tanaka |
| 5,870,232 A | 2/1999 | Tsuji et al. |
| 5,909,600 A | 6/1999 | Kosako |
| 5,912,772 A | 6/1999 | Aoki |
| 5,926,322 A | 7/1999 | Iwasaki |
| 6,031,998 A | 2/2000 | Shono |
| 6,052,535 A | 4/2000 | Uno |
| 6,055,116 A | 4/2000 | Nomura et al. |
| 6,064,533 A | 5/2000 | Kenin et al. |
| 6,069,745 A | 5/2000 | Fujii et al. |
| 6,075,655 A | 6/2000 | Funahashi et al. |
| 6,115,190 A | 9/2000 | Hirai |
| 6,185,375 B1 | 2/2001 | Mikami |
| 6,204,977 B1 | 3/2001 | Iwasa |
| 6,324,019 B1 | 11/2001 | Takanashi et al. |
| 6,366,323 B1 | 4/2002 | Shono |
| 6,665,129 B2 | 9/2002 | Nomura et al. |
| 6,490,099 B2 | 12/2002 | Sasaki |
| 6,570,718 B2 | 5/2003 | Nomura et al. |
| 6,611,663 B2 | 8/2003 | Nakagawa |
| 6,711,349 B1 | 3/2004 | DiRisio |
| 6,757,489 B2 | 6/2004 | Nomura et al. |
| 6,937,816 B2 * | 8/2005 | Endo et al. .................. 396/79 |
| 2001/0017738 A1 | 8/2001 | Nomura et al. |
| 2001/0019458 A1 | 9/2001 | Nomura et al. |
| 2001/0024573 A1 | 9/2001 | Nomura et al. |
| 2002/0135896 A1 | 9/2002 | Nomura et al. |
| 2002/0135900 A1 | 9/2002 | Nomura et al. |
| 2002/0135901 A1 | 9/2002 | Nomura et al. |
| 2002/0181953 A1 | 12/2002 | Ichinokawa |
| 2003/0007796 A1 | 1/2003 | Nomura et al. |
| 2003/0081325 A1 | 5/2003 | Nomura et al. |
| 2003/0081327 A1 | 5/2003 | Nomura et al. |
| 2003/0081948 A1 | 5/2003 | Nomura et al. |
| 2003/0156832 A1 | 8/2003 | Nomura et al. |
| 2004/0042089 A1 | 3/2004 | Nomura |
| 2004/0042090 A1 | 3/2004 | Nomura |
| 2004/0042091 A1 | 3/2004 | Nomura |
| 2004/0042092 A1 | 3/2004 | Nomura |
| 2004/0042093 A1 | 3/2004 | Nomura |
| 2004/0042095 A1 | 3/2004 | Nomura |
| 2004/0042096 A1 | 3/2004 | Nomura |
| 2004/0042775 A1 | 3/2004 | Nomura |
| 2004/0042776 A1 | 3/2004 | Nomura |
| 2004/0042777 A1 | 3/2004 | Nomura |
| 2004/0042778 A1 | 3/2004 | Nomura |
| 2004/0051967 A1 | 3/2004 | Nomura |
| 2004/0051968 A1 | 3/2004 | Nomura |
| 2004/0051969 A1 | 3/2004 | Nomura |
| 2004/0051970 A1 | 3/2004 | Nomura |
| 2004/0051971 A1 | 3/2004 | Nomura |
| 2004/0051972 A1 | 3/2004 | Nomura |
| 2004/0051981 A1 | 3/2004 | Nomura |
| 2004/0062536 A1 | 4/2004 | Nomura |
| 2004/0062537 A1 | 4/2004 | Nomura |
| 2004/0076418 A1 | 4/2004 | Nomura |
| 2004/0091253 A1 | 5/2004 | Nomura |
| 2004/0141735 A1 | 7/2004 | Nomura |
| 2004/0141736 A1 | 7/2004 | Nomura |
| 2004/0141737 A1 | 7/2004 | Nomura |
| 2004/0151490 A1 | 8/2004 | Nomura |
| 2004/0227844 A1 | 11/2004 | Sakamoto |
| 2006/0045517 A1 * | 3/2006 | Kato .......................... 396/349 |
| 2006/0115255 A1 * | 6/2006 | Nomura ..................... 396/55 |
| 2006/0233543 A1 * | 10/2006 | Homme ..................... 396/349 |

FOREIGN PATENT DOCUMENTS

| | | |
|---|---|---|
| DE | 19623066 | 12/1997 |
| EP | 0598703 | 5/1994 |
| EP | 0634680 | 1/1995 |
| EP | 0810466 | 3/1997 |
| GB | 2261298 | 5/1993 |
| GB | 2262356 | 6/1993 |
| GB | 2309551 | 7/1997 |
| GB | 2344661 | 6/2000 |
| GB | 2344662 | 6/2000 |
| GB | 2394787 | 5/2004 |
| GB | 2394561 | 4/2006 |
| JP | 58-10708 | 1/1982 |
| JP | 58-145930 | 8/1983 |
| JP | 58-162914 | 9/1983 |
| JP | 61-69002 | 4/1986 |
| JP | 61-133933 | 6/1986 |
| JP | 61-270737 | 12/1986 |
| JP | 63-149629 | 6/1988 |
| JP | 64-34623 | 3/1989 |
| JP | 5-313226 | 11/1993 |
| JP | 6-18777 | 1/1994 |
| JP | 6-230263 | 8/1994 |
| JP | 6-308592 | 11/1994 |
| JP | 7-191249 | 7/1995 |
| JP | 7-199019 | 8/1995 |
| JP | 7-288724 | 10/1995 |
| JP | 7-295050 | 11/1995 |
| JP | 8-313790 | 11/1996 |
| JP | 9-5849 | 1/1997 |
| JP | 9-15682 | 1/1997 |
| JP | 10-32740 | 2/1998 |
| JP | 10-254054 | 9/1998 |
| JP | 10-282394 | 10/1998 |
| JP | 11-004371 | 1/1999 |
| JP | 11-109203 | 4/1999 |
| JP | 2000-023002 | 1/2000 |
| JP | 2002-277719 | 9/2002 |
| JP | 2003-114473 | 4/2003 |
| JP | 2003-149723 | 5/2003 |
| JP | 2003-207709 | 7/2003 |
| JP | 2003-315861 | 11/2003 |
| JP | 2004-257555 | 9/2004 |
| KR | 2004-19247 | 4/2000 |

OTHER PUBLICATIONS

English Language Abstract JP 58-10708, Jan. 21, 1982.
English Language Abstract JP2003-207709, Jul. 25, 2003.
English Language Abstract JP 2002-277719, Sep. 25, 2002.
English Language Abstract JP10-282394, Oct. 23, 1998.
English Language Abstract JP58-162914, Sep. 27, 1984.
English Language Abstract of JP 9-15682, Jan. 17, 1997.
U.S. Appl. No. 10/646,724 to Nomura, filed Aug. 25, 2003.

English Language Abstract of JP 2003-149723, May 2003.
English Language Abstract of JP6-18777, Jan. 28, 1994.
English Language Abstract of JP8-313790, Nov. 29, 1996.
English Language Abstract of JP6-230263, Aug. 19, 1994.
English Language Abstract of JP10-254054, Sep. 25, 1998.
Pentax Press News, "Pentax Optio S", Feb. 4, 2003, together with an English Language translation of the same.
Digital CAPA Mar. 2003, together with an English translation of the same.

Pentax News Release, "A High-Quality Zoom Lens Digital Camera so Small that it Fits into a Tin of Altoids", Jan. 8, 2003.
Reissue U.S. Appl. No. 10/815,193 to Shono filed Apr. 1, 2004.
Reissue U.S. Appl. No. 10/815,194 to Shono filed Apr. 1, 2004.
English Language Abstract of JP61-133933, Jun. 21, 1986.
English language Abstract of JP 2003-315861, Nov. 6, 2003.

* cited by examiner

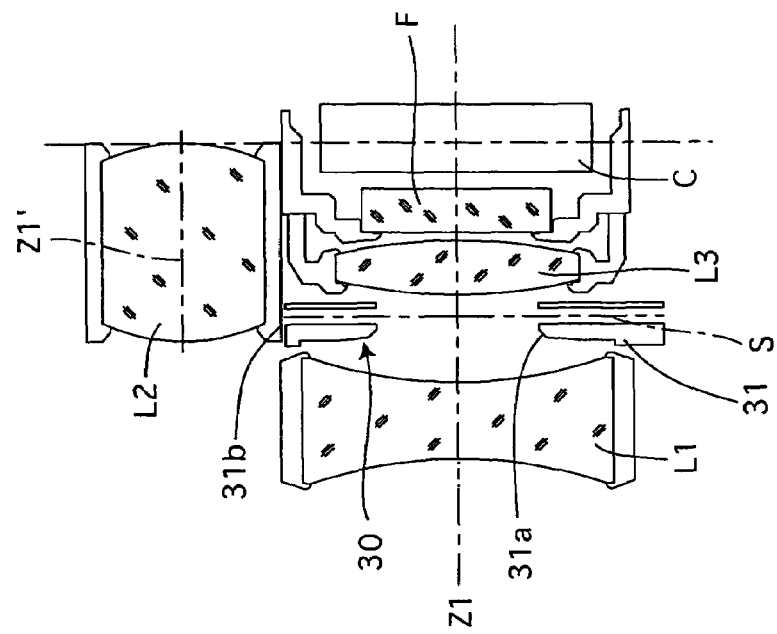
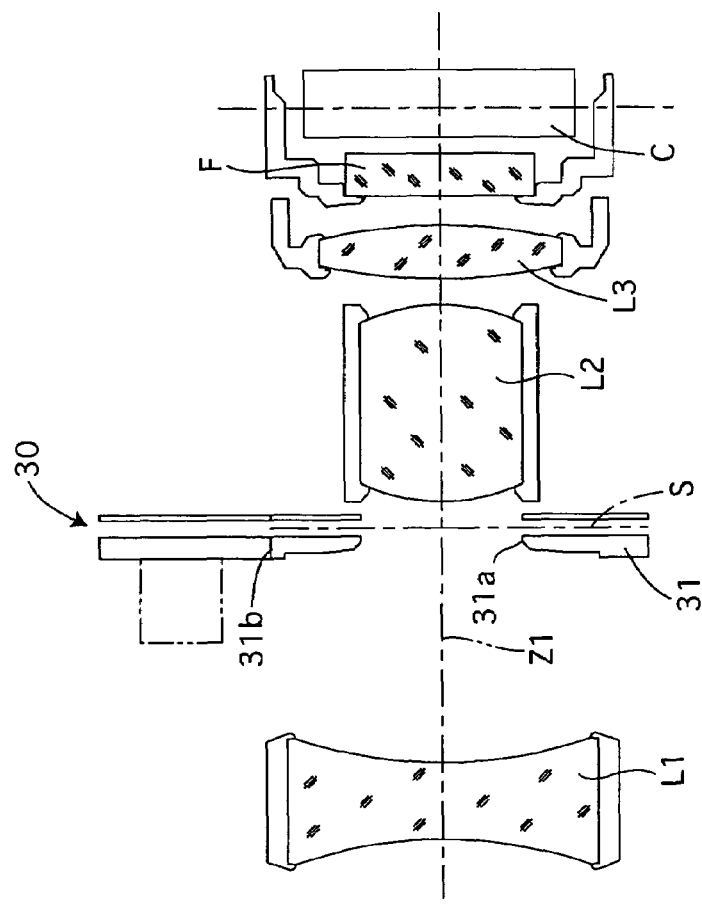

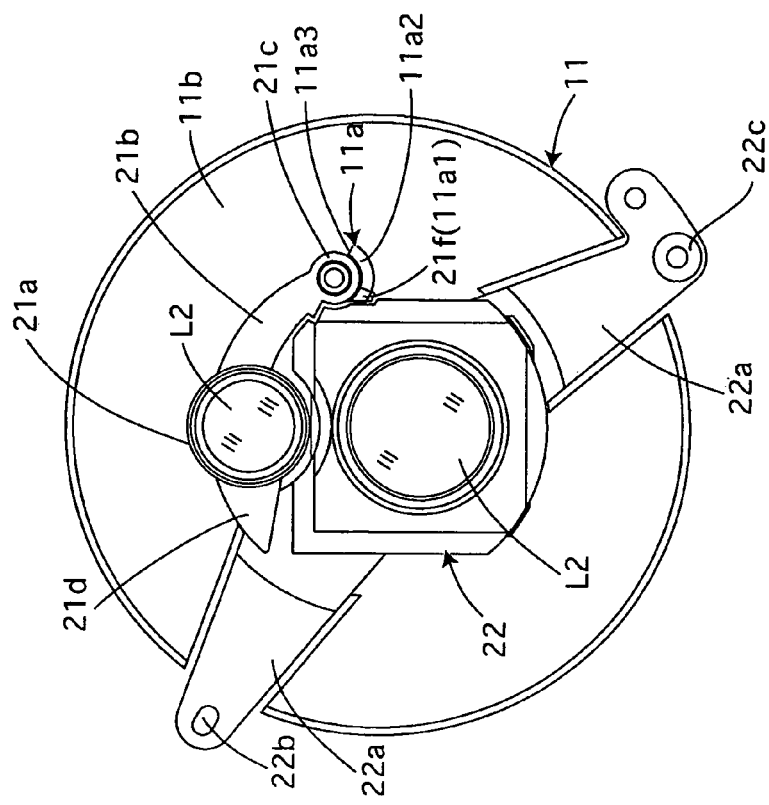
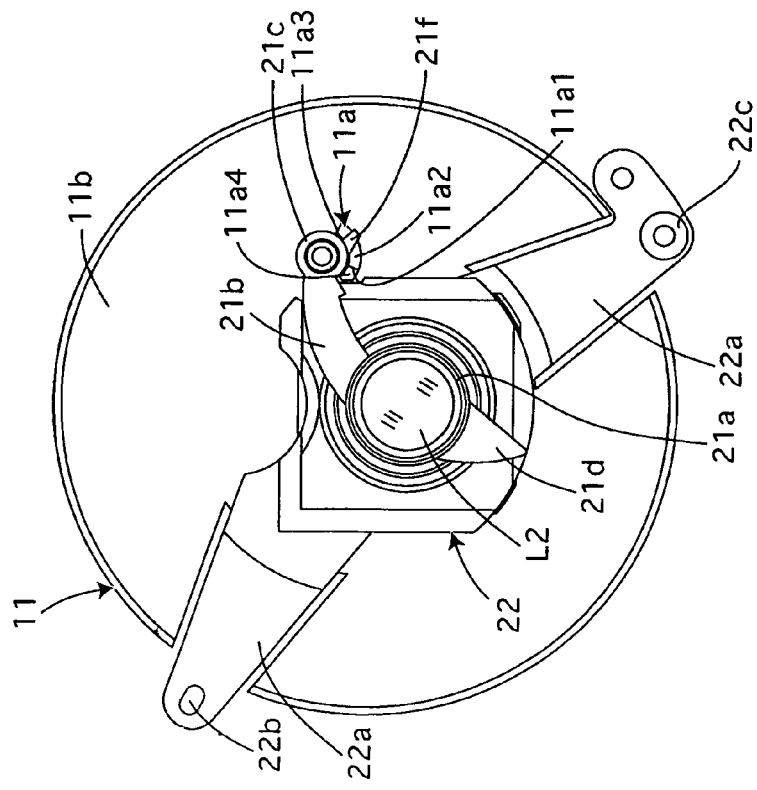

RETRACTABLE LENS SYSTEM AND A CAMERA INCORPORATING THE RETRACTABLE LENS SYSTEM

BACKGROUND OF THE INVENTION

1. Field of the Invention

The present invention relates to a retractable lens system which can extend from and retract into a body of an optical instrument such as a camera using sensitive film or a digital camera using a CCD or CMOS image sensor. The present invention also relates to a camera which incorporates such a retractable lens system.

2. Description of the Related Art

The demand for miniaturization in compact cameras is ever increasing. Specifically, in cameras having a retractable photographing lens (retractable lens system) which is substantially fully retracted into a camera body when the camera is not in use, there has been a strong demand for a further reduction of the length of the retractable photographing lens when fully retracted. As a solution to such a demand, the assignee of the present invention has proposed a retractable lens system which is disclosed in Japanese laid-open patent publication 2003-315861. This retractable lens system is characterized in that a plurality of optical elements of the retractable lens system are positioned on a common optical axis to constitute a photographing optical system when the retractable lens system is in a ready-to-photograph state, and that at least one removable optical element of the plurality of optical elements is moved to a removed position outside of the common optical axis while the removable optical element and at least one element of the remaining elements of the plurality of optical elements are moved rearward when the retractable lens system changes from the ready-to-photograph state to a retracted state (accommodated state).

SUMMARY OF THE INVENTION

The present invention provides a retractable lens system having a structure making a further reduction of the length of the retractable lens system possible when fully retracted. The present invention also provides a camera which incorporates such a retractable lens system.

According to an aspect of the present invention, a retractable lens system is provided, including a plurality of optical elements of a photographing optical system, wherein all of the plurality of optical elements are positioned on a common optical axis when the retractable lens system is in a ready-to-photograph state. When the retractable lens system changes from the ready-to-photograph state to a retracted state, at least one removable optical element of the plurality of optical elements is moved to a removed position outside of the common optical axis, and the removable optical element and at least one optical element of the remaining optical elements of the plurality of optical elements are moved rearward. The at least one optical element of the remaining optical elements includes a linearly movable element which moves in the common optical axis direction without changing a distance between the linearly movable element and the removable optical element in the common optical axis direction when the retractable lens system is in the ready-to-photograph state. At least a part of the removable optical element and at least a part of the linearly movable element are positioned to lie in a common plane perpendicular to the common optical axis when the retractable lens system changes from the ready-to-photograph state to the retracted state.

It is desirable for the retractable lens system to include a movable ring which supports the linearly movable element and the removable optical element in a manner such that the linearly movable element and the removable optical element integrally move in the common optical axis direction when the retractable lens system is in the ready-to-photograph state, and which moves rearward when the retractable lens system changes from the ready-to-photograph state to the retracted state; and a position control mechanism for supporting the removable optical element in the movable ring so that the removable optical element is movable both in a plane perpendicular to common the optical axis and in the common optical axis direction, and for positioning the removable optical element behind the linearly movable element when the retractable lens system is in the ready-to-photograph state.

It is desirable for the linearly movable element to include an exposure control member including at least one of a shutter and a diaphragm.

It is desirable for the position control mechanism to include a rotational shaft extending parallel to the common optical axis, and provided inside of the movable ring to be eccentric from the common optical axis; a holder frame which holds the removable optical element and is engaged with the rotational shaft to be rotatable on the rotational shaft and movable in the common optical axis direction; a biasing member which biases the holder frame rearward in the common optical axis direction on the rotational shaft; and a rearward movement limit device which determines a limit of a rearward movement of the holder frame in the movable ring.

It is desirable for the retractable lens system to include a second rearward movement limit device provided on a stationary member which is immovable in the common optical axis direction, and positioned behind the holder frame when the retractable lens system is in the ready-to-photograph state. When the retractable lens system changes from the ready-to-photograph state to the retracted state, the holder frame partly comes into contact with the second rearward movement limit device to be prevented from further moving rearward at a midpoint of the rearward movement of the movable ring, and subsequently the movable ring continues to move rearward against a biasing force of the biasing member.

It is desirable for the biasing member to be a compression coil spring.

It is desirable for the retractable lens system to include a removing device for removing the holder frame to the removed position by rotating the holder frame about the rotational shaft with aid of a rearward moving force of the movable ring and the holder frame when the retractable lens system changes from the ready-to-photograph state to the retracted state; and a forward movement limit device for preventing the holder frame from moving forward in the common optical axis direction relative to the movable ring during operation of the removing device.

It is desirable for the removing device to include a cam projection which projects forward in the common optical axis direction from a stationary member provided behind the movable ring, a cam surface contactable with the holder frame being formed at a front end of the cam projection.

It is desirable for the retractable lens system can include at least one rear optical element which is positioned behind the removable optical element when the retractable lens system is in the ready-to-photograph state. At least a part of the rear optical element and at least a part of the removable optical element lie in a common plane perpendicular to the common optical axis when the retractable lens system is in the retracted state.

It is desirable for the photographing optical system to include a zoom lens system which consists of a plurality of lens groups including the removable optical element.

It is desirable for the retractable lens system to be incorporated in a camera.

It is desirable for the retractable lens system to change from the ready-to-photograph state to the retracted state when a main switch of the camera is turned OFF.

It is desirable for the removable optical element to be one of the plurality of optical elements which is positioned between a frontmost optical element and a rearmost optical element of the plurality of optical elements.

It is desirable for the removable optical element to be positioned behind the linearly movable element adjacent thereto when the retractable lens system is in the ready-to-photograph state.

In another embodiment, a retractable lens system is provided, including a plurality of optical elements of a photographing optical system, wherein all of the plurality of optical elements are positioned on a common optical axis when the retractable lens system is in a ready-to-photograph state. When the retractable lens system changes from the ready-to-photograph state to a retracted state, at least one removable optical element of the plurality of optical elements is moved to a removed position outside of the common optical axis, and the removable optical element and at least one optical element of the remaining optical elements of the plurality of optical elements are moved rearward. The retractable lens system includes a movable ring which supports the removable optical element inside of the movable ring, and moves rearward when the retractable lens system changes from the ready-to-photograph state to the retracted state. The movable ring and the removable optical element integrally move in the common optical axis direction when the retractable lens system is in the ready-to-photograph state. The amount of rearward movement of the movable ring is greater than that of the removable optical element in the common optical axis direction when the retractable lens system changes from the ready-to-photograph state to the retracted state.

It is desirable for the retractable lens system to include a linearly movable element which integrally moves together with the movable ring in the common optical axis direction when moving in the common optical axis direction, and is positioned in front of the removable optical element when the retractable lens system is in the ready-to-photograph state; and a position control mechanism for positioning at least a part of the removable optical element and at least a part of the linearly movable element in a common plane perpendicular to the common optical axis when the retractable lens system changes from the ready-to-photograph state to the retracted state.

In an embodiment, a retractable lens system is provided, including linearly movable optical elements which are movable only linearly along a common optical axis thereof; and at least one removable optical element which is positioned on the common optical axis when the retractable lens system is in a ready-to-photograph state, and is moved to a removed position outside of the common optical axis when the retractable lens system changes from the ready-to-photograph state to a retracted state. The linearly movable optical elements and the removable optical element are moved rearward when the retractable lens system changes from the ready-to-photograph state to the retracted state. A forward optical element of the linearly movable optical elements is positioned immediately in front of the removable optical element when the retractable lens system is in the ready-to-photograph state. At least a part of the removable optical element and at least a part of the forward optical element of the linearly movable elements, which is positioned immediately in front of the removable optical element when retractable lens system is in the ready-to-photograph state, lie in a common plane perpendicular to the common optical axis when the retractable lens system is in the retracted state.

It is desirable for the retractable lens system to include a movable ring which supports the removable optical element and the forward optical element in a manner so that the removable optical element and the one of the linearly movable elements integrally move in the common optical axis direction when the retractable lens system is in the ready-to-photograph state, and which moves rearward at least when the retractable lens system changes from the ready-to-photograph state to the retracted state; and a position control mechanism for supporting the removable optical element in the movable ring so that the removable optical element is movable both in a plane perpendicular to the common optical axis and in the optical axis direction, and for positioning the removable optical element behind the forward optical element when the retractable lens system is in the ready-to-photograph state.

It is desirable for the forward optical element to include an exposure control member including at least one of a shutter and a diaphragm.

In an embodiment, a retractable lens system is provided, including an exposure control member including at least one of a shutter and a diaphragm; and a plurality of optical elements excluding the exposure control member, wherein the exposure control member and the plurality of optical elements are positioned on a common optical axis when the retractable lens system is in a ready-to-photograph state. When the retractable lens system changes from the ready-to-photograph state to a retracted state, at least one removable optical element of the plurality of optical elements is moved to a removed position outside of the common optical axis, and the removable optical element and the exposure control member are moved rearward. The removable optical element is positioned behind the exposure control member when the retractable lens system is in the ready-to-photograph state. The exposure control member and at least a part of the removable optical element lie in a common plane perpendicular to the common optical axis when the retractable lens system is in the retracted state.

It is desirable for the retractable lens system to include a movable ring which supports the exposure control member and the removable optical element in a manner such that the exposure control member and the removable optical element integrally move in the common optical axis direction when the retractable lens system is in the ready-to-photograph state, and which moves rearward when the retractable lens system changes from the ready-to-photograph state to the retracted state; and a position control mechanism for supporting the removable optical element in the movable ring so that the removable optical element is movable both in a plane perpendicular to the common optical axis and in the common optical axis direction, and for positioning the removable optical element behind the exposure control member when the retractable lens system is in the ready-to-photograph state.

According to the present invention, the length of the retractable lens system when fully retracted can further be reduced, and also a camera incorporating such a retractable lens system can be miniaturized.

The present disclosure relates to subject matter contained in Japanese Patent Application No. 2004-079043 (filed on Mar. 18, 2004) which is expressly incorporated herein by reference in its entirety.

BRIEF DESCRIPTION OF THE DRAWINGS

The present invention will be described below in detail with reference to the accompanying drawings in which:

FIG. 3A is a cross sectional view of elements (which include lens groups, a diaphragm shutter, a low-pass filter and a CCD) of the retractable zoom lens shown in FIG. 1;

FIG. 3B is a cross sectional view of the elements (shown in FIG. 3A) of the retractable zoom lens shown in FIG. 2;

FIG. 7A is a front elevational view of the elements shown in FIG. 4, in a ready-to-photograph state, with the linear guide ring and the second lens group support frame being removed for clarity;

FIG. 7B is a view similar to that of FIG. 7A and illustrates the elements shown in FIG. 4, in a fully retracted state, with the linear guide ring and the second lens group support frame being removed for clarity;

DESCRIPTION OF THE PREFERRED EMBODIMENT

The overall structure of a first embodiment of a retractable zoom lens according to the present invention will be hereinafter discussed with reference to FIGS. 1 through 3. The retractable zoom lens 10 is incorporated in a digital camera 5, and is provided with a photographing optical system having a first lens group L1, a shutter (linearly movable element/front optical element/exposure control member) S, a second lens group (removable optical element) L2, a third lens group (rear optical element) L3, a low-pass filter (optical filter/rear optical element) F, and a CCD image sensor (solid-state image pick-up device/rear optical element) C. "Z1" shown in FIG. 1 designates the optical axis (common optical axis) of the photographing optical system. The shutter S also functions as a diaphragm, and is shown by a one-dot chain line perpendicular to the common optical axis Z1 in FIGS. 1 through 3B. The first lens group L1 and the second lens group L2 are driven along the common optical axis Z1 in a predetermined moving manner to perform a zooming operation, while the third lens group L3 is driven along the common optical axis Z1 to perform a focusing operation. Note that the zooming operation can be performed by moving at least two lens groups in the optical axis direction, such as in the present embodiment, or by moving at least one lens group and the image surface (for example the CCD image sensor) in the optical axis direction.

Figure 1:
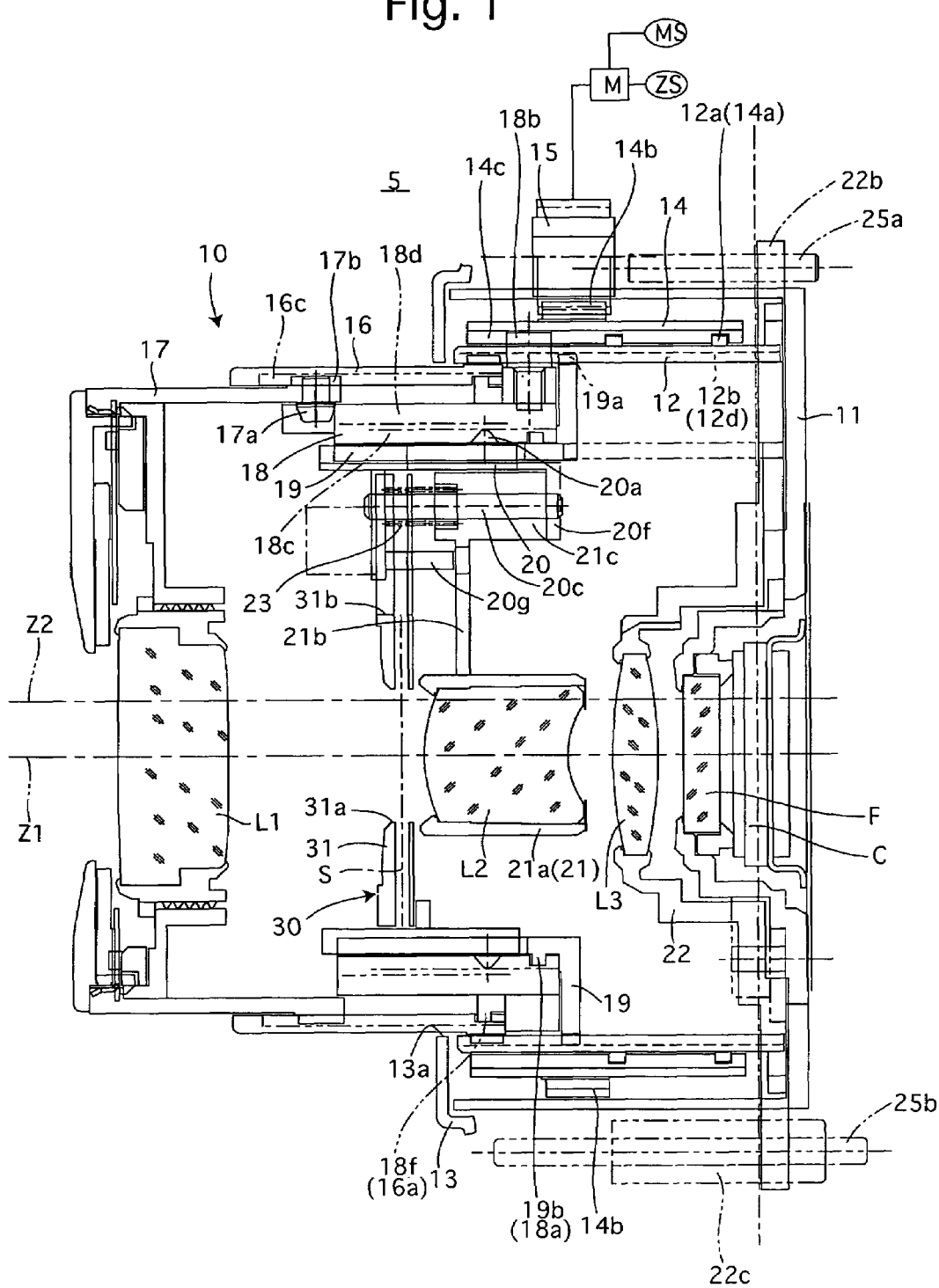
FIG. 1 is a longitudinal cross-sectional view of an embodiment of a retractable zoom lens of a digital camera in a ready-to-photograph state, according to the present invention.
Figure 2:
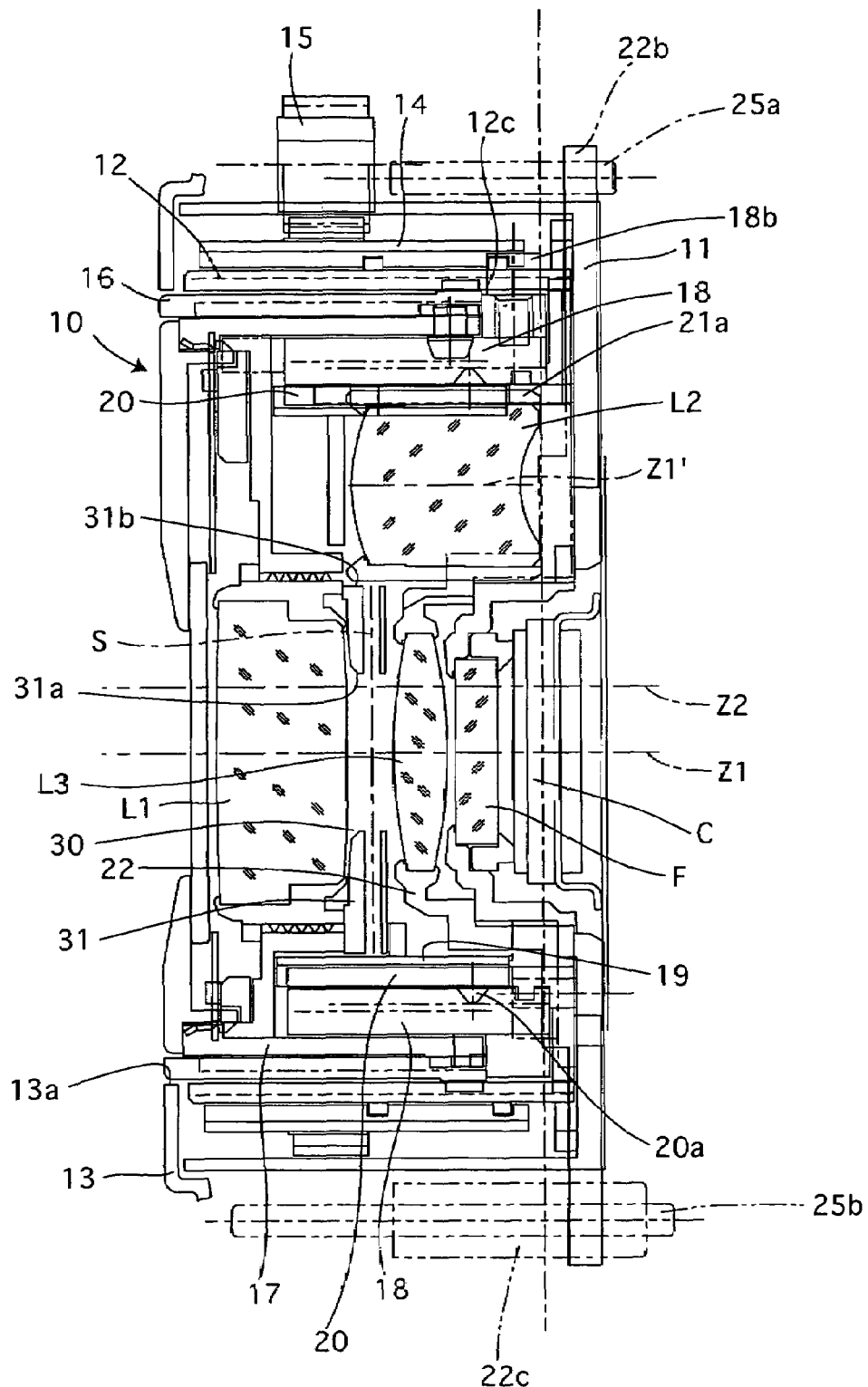
FIG. 2 is a longitudinal cross-sectional view of the retractable zoom lens shown in FIG. 1 in a fully retracted state when the camera is not in use.

In the retractable zoom lens 10 having the above described photographing optical system, all the optical elements of the photographing optical system are positioned on the common optical axis Z1 in a ready-to-photograph state as shown in FIGS. 1 and 3A; whereas the second lens group L2 is removed from a position on the common optical axis Z1 in a direction perpendicular to the common optical axis Z1 to be positioned on an eccentric optical axis (removable-optical-element optical axis) Z1' (see FIGS. 2 and 3B) in a fully retracted state (retracted position) as shown in FIGS. 2 and 3B. When the second lens group L2 is moved to the removed position, the second lens group L2 does not overlap the other optical elements of the photographing optical system (i.e., the first lens group L1, shutter (diaphragm) S, the third lens group L3, the low-pass filter F and the CCD image sensor C) in the optical axis direction. At the same time, in the fully retracted state, the second lens group L2 (i.e., an optical element having been removed from the common optical axis Z1) is retracted along the eccentric optical axis Z1' while also at least one of the remaining optical elements of the photographing optical system, which are not removed from the common optical axis Z1, are retracted along (parallel to) the common optical axis Z1. The manner of such movements of the optical elements of the photographing optical system makes a further reduction of the length of the retractable zoom lens 10 possible when the retractable zoom lens 10 is fully retracted.

When the retractable zoom lens 10 is changed from the ready-to-photograph state shown in FIGS. 1 and 3A to the fully retracted state shown in FIGS. 2 and 3B, firstly the second lens group L2 is radially retracted from a position on the common optical axis Z1 to be placed on the eccentric optical axis Z1', which is eccentric with respect to the common optical axis Z1 on which the remaining optical elements of the photographing optical system lie. Subsequently, the second lens group L2 is retracted along the eccentric optical axis Z1' and at the same time the first lens group L1, the shutter (diaphragm) S and the third lens group L3, among the aforementioned remaining optical elements of the photographing optical system, are retracted along the common optical axis Z1. In the fully retracted state (fully accommodated state) shown in FIGS. 2 and 3B, the removed second lens group L2 which lies on the eccentric optical axis Z1' and other optical elements of the photographing optical system which lie on the common optical axis Z1 (i.e., the third lens group L3, the low-pass filter F and the CCD image sensor C in this particular embodiment) are positioned so as to overlap in the same positional range in the optical axis direction of the optical axes Z1 and Z1'. Specifically, the second lens group L2 is positioned radially outside of the third lens group L3, the low-pass filter F and the CCD image sensor C with respect to the common optical axis Z1 (in a direction perpendicular to the common optical axis Z1), in the fully retracted state. In other words, in the fully retracted state shown in FIGS. 2 and 3B, the positional range of the removed second lens group L2 in the optical axis direction overlaps the positional range of other optical elements of the photographing optical system which lie on the common optical axis Z1 (i.e., the third lens group L3, the low-pass filter F and the CCD image sensor C in this particular embodiment) in the optical axis direction, which substantially removes the space on the common optical axis Z1 for accommodating the second lens group L2 to thereby make it possible to reduce the length of the retractable zoom lens 10 when the retractable zoom lens 10 is fully retracted.

Although the second lens group L2 and the shutter (diaphragm) S that is positioned immediately in front of the second lens group L2 move without changing the distance therebetween in the optical axis direction in a ready-to-photograph state in the present embodiment of the retractable zoom lens 10, the amount of rearward movement (amount of retraction) of the second lens group L2 becomes relatively greater than that of the shutter (diaphragm) S to cause the second lens group L2 to be partly positioned in a plane perpendicular to the common optical axis Z1 in which the shutter (diaphragm) S lies when the retractable zoom lens 10 is fully retracted from a ready-to-photograph state. This structure, which will be discussed in detail later, makes a further reduction of the length of the retractable zoom lens 10 possible when the retractable zoom lens 10 is fully retracted.

The structure of the retractable zoom lens 10 which makes it possible to achieve the above described manner of retraction of the optical elements of the photographing optical system will be discussed in detail with reference mainly to FIGS. 1 and 2. The retractable zoom lens 10 is provided with a CCD frame 11, a stationary barrel 12 and a front exterior frame 13, which are all stationary elements. The low-pass filter F and the CCD image sensor C are fixed to the CCD frame 11. The front exterior frame 13 is provided with an opening 13a through which outer and inner linear barrels 16 and 17 extend and retract the retractable zoom lens 10.

A rotatable ring 14 is fitted on the stationary barrel 12 to be rotatable about a rotational axis Z2 and to be immovable along the rotational axis Z2. The stationary barrel 12 is provided on an outer peripheral surface thereof with a set of radial projections 12a, and the rotatable ring 14 is provided on an inner peripheral surface thereof with a corresponding set of circumferential grooves 14a in which the set of radial projections 12a of the stationary barrel 12 are respectively engaged to be slidable in the set of circumferential grooves 14a therealong. Due to the engagement of the radial projections 12a with the circumferential grooves 14a, the rotatable ring 14 is supported by the stationary barrel 12 to be rotatable thereon about the rotational axis Z2 while being prevented from moving along the rotational axis Z2. The rotatable ring 14 is provided on an outer peripheral surface thereof with a circumferential gear 14b which is in mesh with a pinion 15. The pinion 15 is driven to rotate by a motor M (see FIG. 1). Rotating the pinion 15 forward and reverse by the motor M causes the rotatable ring 14 to rotate forward and reverse about the rotational axis Z2. The rotational axis Z2 is eccentric to the common optical axis Z1 of the photographing optical system. The rotatable ring 14 is provided on an inner peripheral surface thereof with a set of rotation transfer grooves 14c. Annular members (16, 17, 18, 19 and 20) which will be discussed hereinafter are arranged coaxially about the rotational axis Z2.

The retractable zoom lens 10 is provided therein with the outer and inner linear barrels 16 and 17, a cam ring 18, a linear guide ring 19 and a second lens group support frame (movable ring) 20, in that order in a radial direction from the outside of the retractable zoom lens 10 to the rotational axis Z2. The stationary barrel 12 is provided on an inner peripheral surface thereof with a set of linear guide grooves 12b, and the linear guide ring 19 is provided on an outer peripheral surface thereof with a corresponding set of linear guide projections 19a which are respectively engaged in the set of linear guide grooves 12b. The linear guide ring 19 moves only along the common optical axis Z1. The linear guide ring 19 is provided on an outer peripheral surface thereof with a circumferential projection 19b, while the cam ring 18 is provided on an inner peripheral surface thereof with a circumferential groove 18a in which the circumferential projection 19b is engaged. The engagement of the circumferential projection 19b in the circumferential groove 18a allows the cam ring 18 to rotate about the rotational axis Z2 with respect to the linear guide ring 19 while preventing the cam ring 18 and the linear guide ring 19 from moving relative to each other along the common optical axis Z1. The cam ring 18 is an annular member which moves along the common optical axis Z1 together with the linear guide ring 19 whenever the linear guide ring 19 moves along the common optical axis Z1, and is rotatable about the rotational axis Z2 relative to the linear guide ring 19.

The stationary barrel 12 is provided with a set of cam through slots 12c which radially extend through the wall of the stationary barrel 12. The cam ring 18 is provided with a corresponding set of follower pins 18b which extend radially outwards to extend through the stationary barrel 12 through the set of cam through slots 12c to be engaged in the set of rotation transfer grooves 14c, respectively. The cam profile of the cam through slots 12c is determined so that the cam ring 18 firstly moves to the most extended position thereof shown in FIG. 1 and thereafter only rotates about the rotational axis Z2 via engagement of the cam through slots 12c with the rotation transfer grooves 14c when the rotatable ring 14 is driven to rotate in a forward rotational direction to extend the outer and inner linear barrels 16 and 17 from the opening 13a in a fully retracted state shown in FIG. 2.

Figure 4:
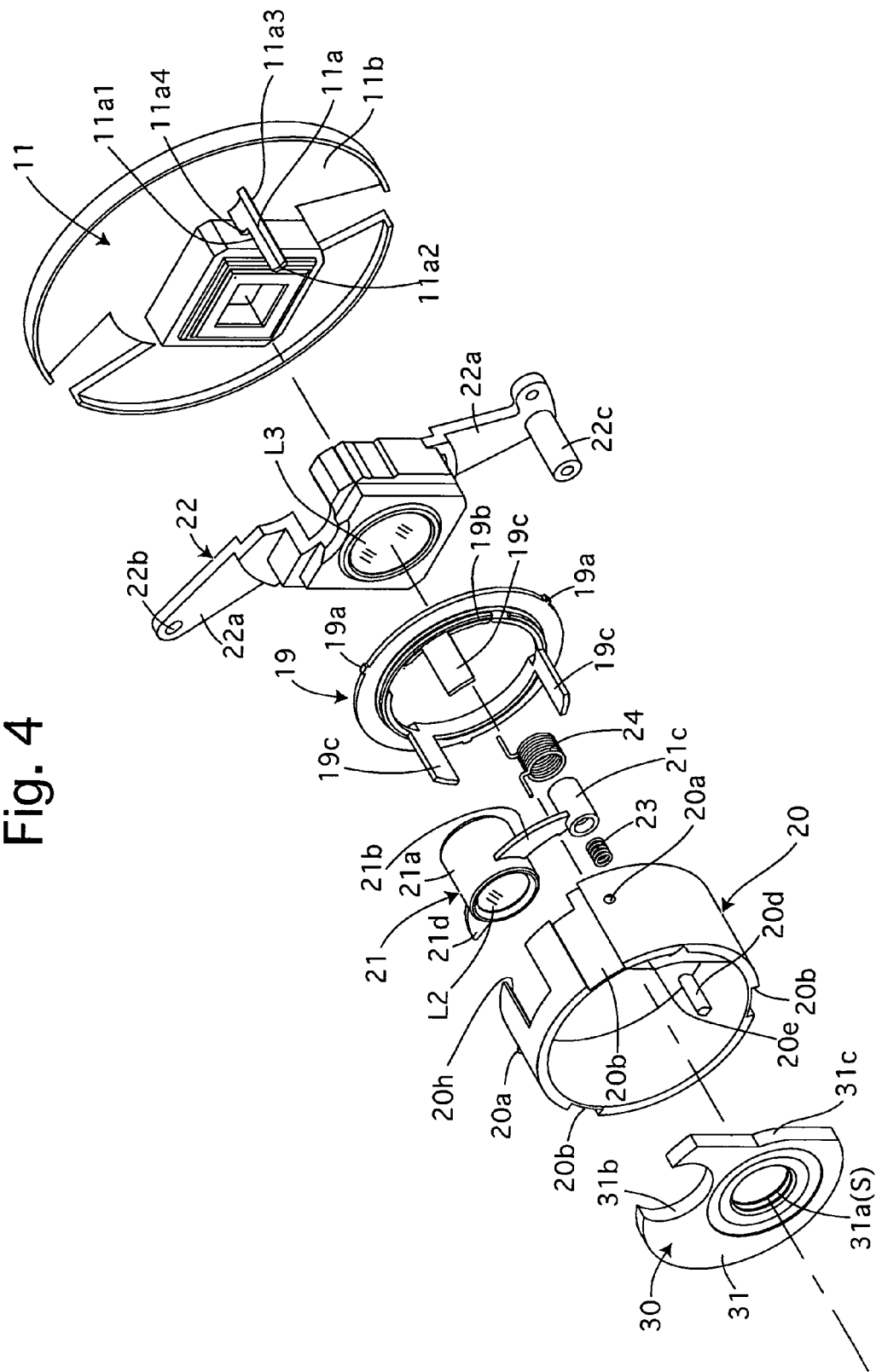
FIG. 4 is an exploded perspective view of elements of the retractable zoom lens shown in FIGS. 1 and 2.

The cam ring 18 is provided on an inner peripheral surface thereof with a set of cam grooves 18c in which a set of follower projections 20a which are formed on an outer peripheral surface of the second lens group support frame 20 are respectively engaged. The cam ring 18 is provided on an outer peripheral surface thereof with a set of cam grooves 18d in which a set of follower pins 17a which are formed on an inner peripheral surface of the inner linear barrel 17 are respectively engaged. As shown in FIG. 4, the second lens group support frame 20 is provided on an outer peripheral surface thereof with a set of linear guide grooves 20b, and the linear guide ring 19 is provided on front thereof with a set of linear guide bars 19c which are respectively engaged in the set of linear guide grooves 20b to be slidable thereon in the direction of the common optical axis Z1, i.e., in the optical axis direction of the photographing optical system of the retractable zoom lens 10. The second lens group support frame 20 is guided in the direction of the common optical axis Z1 by engagement of the linear guide bars 19c with the linear guide grooves 20b. Therefore, forward and reverse rotations of the cam ring 18 cause the second lens group support frame 20 to move forward and rearward along the rotational axis Z2 in accordance with the contours of the set of cam grooves 18c.

The outer and inner linear guide barrels 16 and 18 are coupled to each other so as to move together while being allowed to rotate relative to each other about the rotational axis Z2. Namely, a set of radial projections 18f formed on an outer peripheral surface of the cam ring 18 are slidably engaged in a corresponding set of circumferential grooves 16a formed on an inner peripheral surface of the outer linear guide barrel 16. The outer linear guide barrel 16 is supported by the stationary barrel 12 to be movable only in the direction of the rotational axis Z2 with respect to the stationary barrel 12, while the inner linear guide barrel 17 is supported by the outer linear guide barrel 16 to be movable only in the direction of the rotational axis Z2 with respect to the outer linear guide barrel 16. Namely, a set of linear guide projections 16b which project from an outer peripheral surface of the outer linear guide barrel 16 are engaged in a corresponding set of linear guide grooves 12d which are formed on an inner peripheral surface of the stationary barrel 12 to extend parallel to the rotational axis Z2, and a set of linear guide projections 17b which project from an outer peripheral surface of the inner linear guide barrel 17 are engaged in a corresponding set of linear guide grooves 16c which are formed on an inner peripheral surface of the outer linear guide barrel 16 to extend parallel to the rotational axis Z2. Therefore, forward and reverse rotations of the cam ring 18 cause the inner linear guide barrel 17 to move forward and rearward along the rotational axis Z2 in accordance with the contours of the set of cam grooves 18d.

The inner linear guide barrel 17 serves as a first lens group support frame for supporting the first lens group L1. The retractable photographing lens 10 is provided therein with a rotatable lens frame (an element of a position control mechanism/a holder frame) 21 which serves as a second lens group support frame for supporting the second lens group L2. The retractable photographing lens 10 is provided therein in front of the CCD frame 11 with a third lens frame 22 for supporting the third lens group L3. As shown in FIG. 4, the third lens frame 22 is provided with two radial arms 22a which extend radially outwards in substantially opposite directions. The third lens frame 22 is provided at radially outer ends of the two radial arms 22a with two linear guide portions 22b and 22c having two guide holes in which two parallel guide shafts 25a and 25b (see FIGS. 1 and 2) are slidably engaged, respectively, so that the third lens frame 22 is guided in the direction of the common optical axis Z1 by the guide shafts 25a and 25b. The third lens frame 22 is driven forward and rearward along the common optical axis Z1 by a forward/rearward drive system (not shown). This drive system moves the third lens frame 22 by an amount of movement corresponding to information on object distance.

The retractable zoom lens 10 is provided radially inside the second lens group support frame 20 with a shutter unit 30 which is supported by an inner peripheral surface of the second lens group support frame 20. The shutter unit 30 is provided with a shutter support plate 31 which is fixed to the second lens group support frame 20 to be positioned therein. The shutter (diaphragm) S is movably supported by the shutter support plate 31. The shutter support plate 31 is provided with a photographing aperture 31a which is eccentric to the axial center of the shutter unit 30 slightly downward from the axial center of the shutter unit 30, and is further provided above the photographing aperture 31a with an opening 31b which is formed to allow the second lens group L2 (a part of the rotatable lens frame 21) to enter the opening 31b when the retractable zoom lens 10 is fully retracted.

As described above, the second lens group L2 is a retractable optical element which is retracted to a position eccentric to the common optical axis Z1 when the retractable zoom lens 10 is fully retracted. The mechanism for pulling the second lens group L2 out of a position on the common optical axis Z1 will be hereinafter discussed in detail with reference mainly to FIGS. 4 through 11B.

The second lens group support frame 20 is provided on an inner peripheral surface thereof with a flange-like front shaft support member 20e and a flange-like rear shaft support member (an element of the position control mechanism/a rearward movement limit device) 20f which are apart from each other in the optical axis direction. Front and rear ends of an eccentric pivot (an element of the position control mechanism/a rotational shaft) 20c are fixed to the front shaft support member 20e and the rear shaft support member 20f, respectively. The axis of the eccentric pivot 20c is parallel to the common optical axis Z1 and the rotational axis Z2. The eccentric pivot 20c is provided at a position eccentric to the common optical axis Z1 and the rotational axis Z2. As can be seen from FIGS. 11A and 11B, there is no possibility of either the front shaft support member 20e or the eccentric pivot 20c interfering with the shutter unit 30 though the shutter unit 30 (the shutter support plate 31) and the front shaft support member 20e are positioned in the second lens group support frame 20 substantially in the same range in the optical axis direction because the front shaft support member 20e is positioned to correspond to a cutout portion 31c (see FIG. 4) which is formed on an outer edge of the shutter support plate 31. In addition, the front shaft support member 20e is provided on a rear surface thereof with a forward-movement limit projection (forward-movement limit device) 20g which extends rearward in the optical axis direction.

The rotatable lens frame 21 is provided with a cylindrical lens holder portion 21a, a swing arm 21b and a cylindrical swing portion 21c. The second lens group L2 is fixed to the cylindrical lens holder portion 21a to be supported thereby. The swing arm 21b extends radially from the cylindrical lens holder portion 21a. The cylindrical swing portion 21c extends rearward from a pivoted end (the right end as viewed in FIG. 7B) of the swing arm 21b. The cylindrical swing portion 21c is provided along an axis thereof with a through hole into which an eccentric pivot 20c of the second lens group support frame 20 is fitted so that the rotatable lens frame 21 is freely rotatable about the eccentric pivot 20c. The effective length of the eccentric pivot 20c (which excludes the lengths of the opposite ends thereof which are respectively fitted into the front shaft support member 20e and the rear shaft support member 20f) is determined to be greater than the length of the cylindrical swing portion 21c so that the cylindrical swing portion 21c is also slidable on the eccentric pivot 20c in the optical axis direction (the axial direction of the eccentric pivot 20c). The front and rear limits of the moving range of the cylindrical swing portion 21c on the eccentric pivot 20c are determined by the front shaft support member 20e and the rear shaft support member 20f, respectively. The rotatable lens frame 21 is continuously biased rearward in the optical axis direction by a compression coil spring (an element of the position control mechanism/a biasing member) 23 provided between the front end of the cylindrical swing portion 21c and the front shaft support member 20e.

The second lens group L2, which is fixed to the cylindrical lens holder portion 21a, is movable between a photographing position on the common optical axis Z1 (see FIGS. 5A, 6A, 7A, 8A and 10A) and a removed position (eccentric position), i.e., a position eccentric away from the common optical axis Z1 (see FIGS. 5B, 6B, 7B, 8B and 10B), by a swing movement of the second lens group support frame 20 about the eccentric pivot 20c.

Figure 5A:
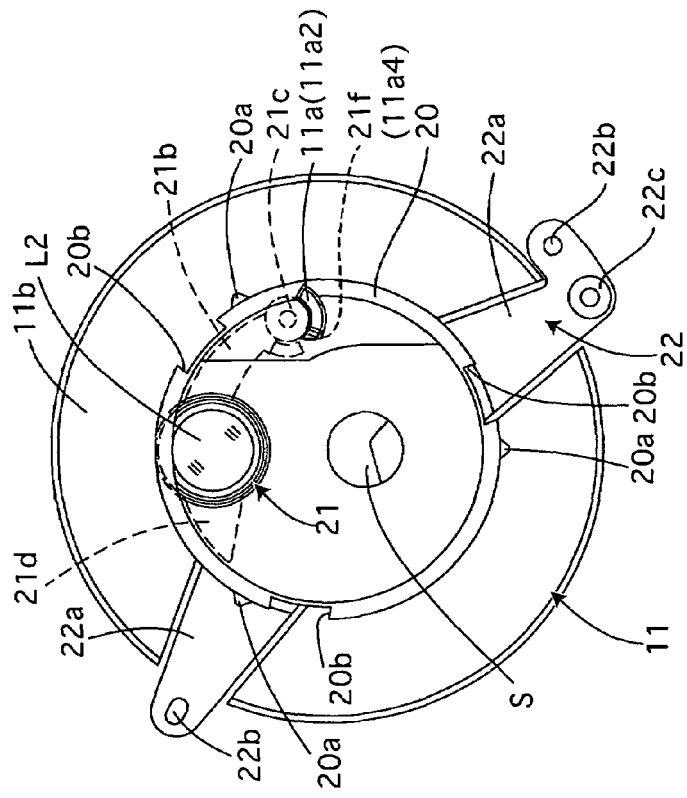
FIG. 5A is a front elevational view of the elements shown in FIG. 4, with a linear guide ring removed for clarity, in a ready-to-photograph state.
Figure 5B:
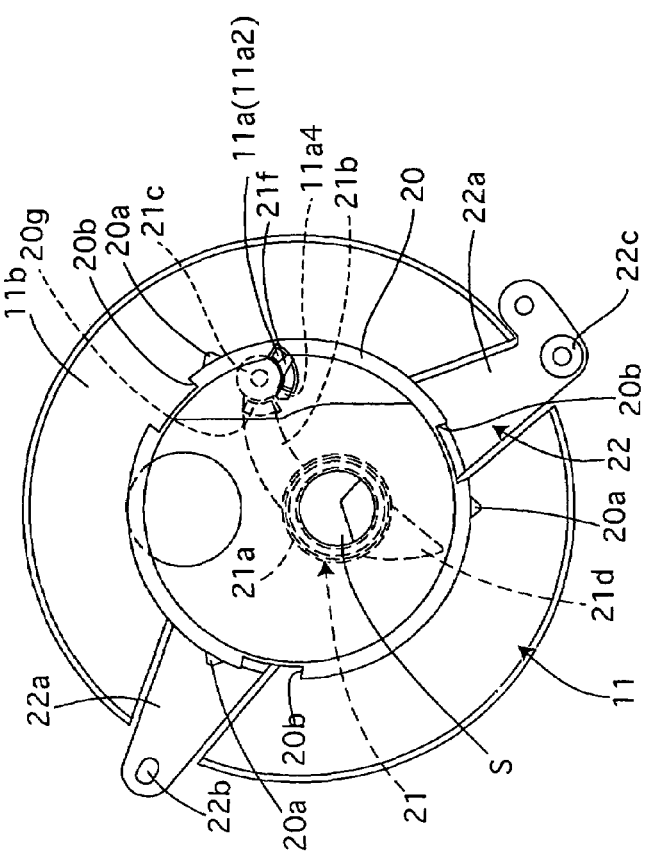
FIG. 5B is a view similar to that of FIG. 5A and illustrates the elements shown in FIG. 4, with the linear guide ring removed for clarity, in a fully retracted state.
Figure 6A:
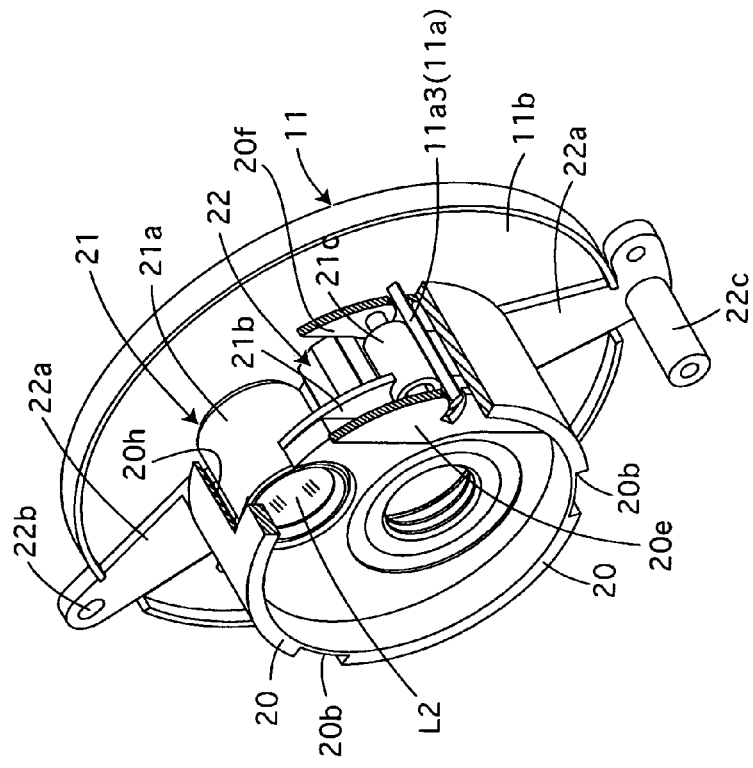
FIG. 6A is a perspective view of the elements shown in FIG. 5A, wherein a second lens group support frame is partially cutaway for clarity.
Figure 6B:
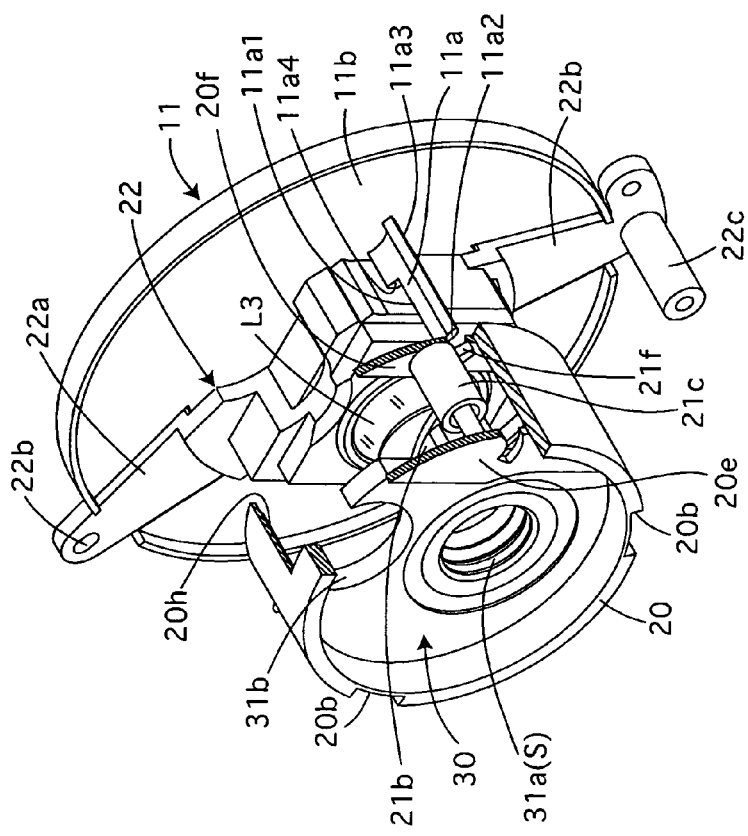
FIG. 6B is a perspective view of the elements shown in FIG. 5B, wherein the second lens group support frame is partially cutaway for clarity.

A torsion coil spring 24 (see FIG. 4) is fitted on the cylindrical swing portion 21c of the rotatable lens frame 21. One engaging end and the other engaging end of the torsion coil spring 24 are engaged with the swing arm 21b and the rear shaft support member 20f, respectively, so that the rotatable lens frame 21 is continuously biased to rotate in a rotational direction (counterclockwise direction as viewed in each of FIGS. 5A, 5B, 6A and 6B) that positions the second lens group L2, which is held by the cylindrical lens holder portion 21a, on the common optical axis Z1. The rotatable lens frame 21 is provided at a free end (swinging end) thereof (at the opposite end with respect to the cylindrical swing portion 21c) with an engaging protrusion 21d which extends from the cylindrical lens holder portion 21a in a direction away from the pivoted end of the rotatable lens frame 21. The second lens group support frame 20 is provided on an inner peripheral surface thereof with a stop protrusion 20d (see FIGS. 4, 10A and 10B) against which the engaging protrusion 21d abuts when the second lens group support frame 20 fully rotates counterclockwise to a position shown in FIGS. 5A and 6A. The second lens group support frame 20 is provided with a cutaway portion 20h into which the cylindrical lens holder portion 21a partly enters when the second lens group L2 moves to the removed position (eccentric position) on the eccentric optical axis Z1', as shown in FIGS. 5B and 6B.

Figure 8A:
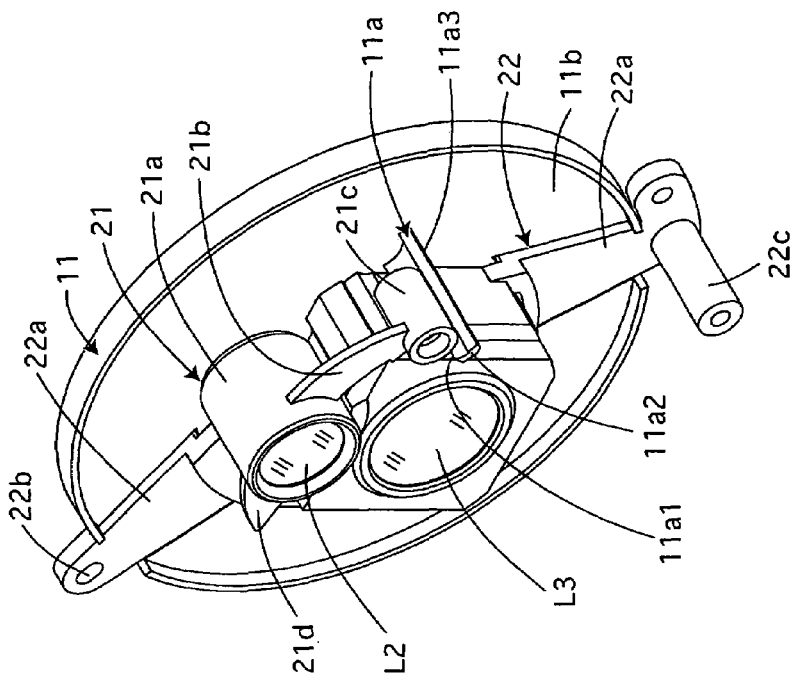
FIG. 8A is a perspective view of the elements shown in FIG. 7A.
Figure 8B:
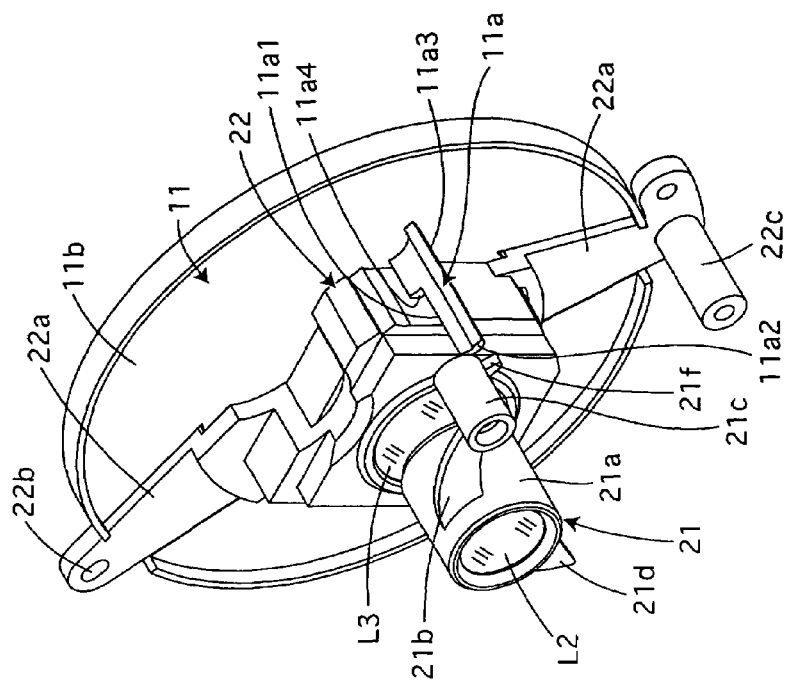
FIG. 8B is a perspective view of the elements shown in FIG. 7B.
Figure 9:
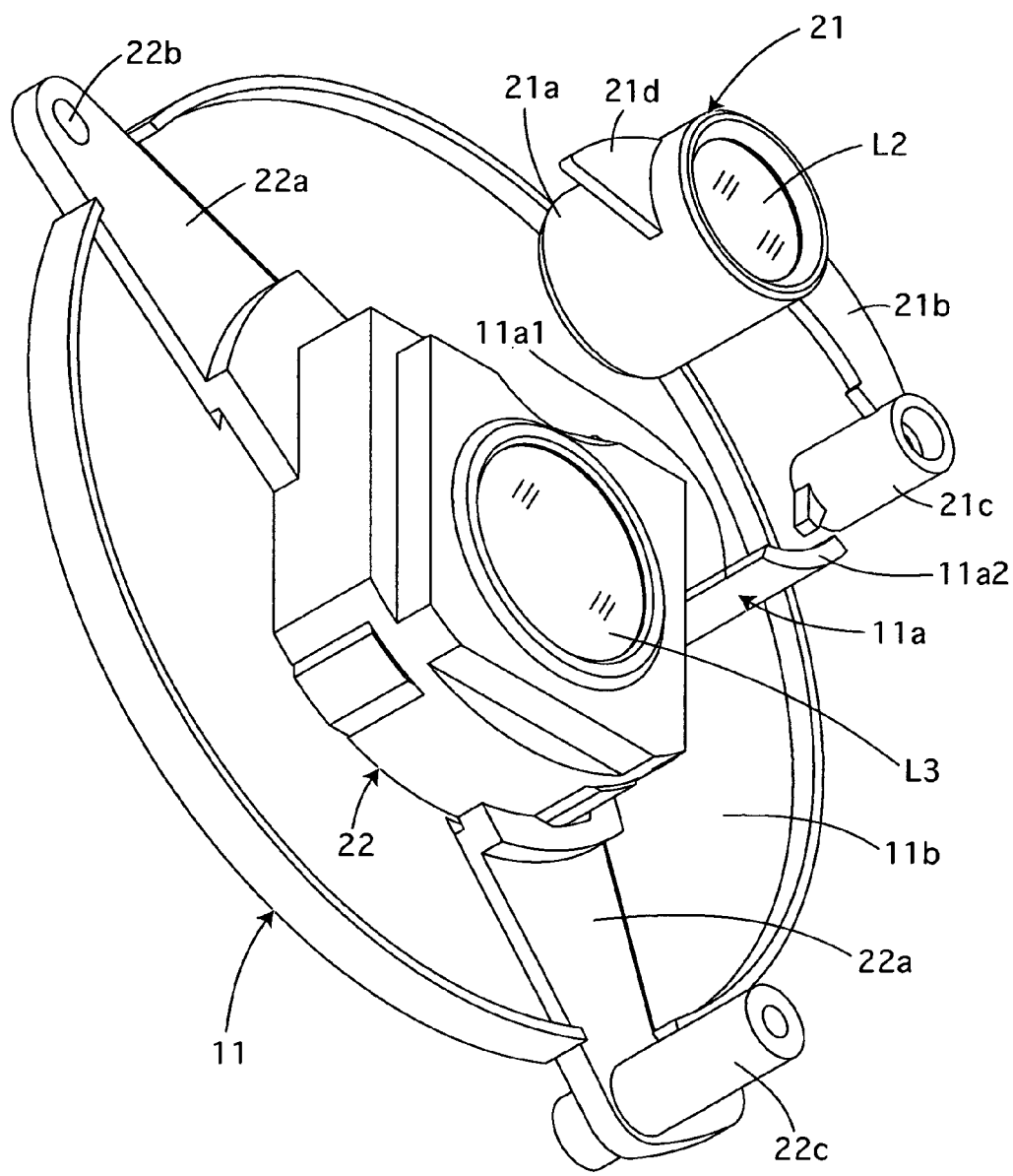
FIG. 9 is an enlarged perspective view of the elements shown in FIGS. 7B and 8B, viewed from an angle different from the angle in FIGS. 6A, 6B, 8A and 8B.

The cylindrical swing portion 21c is provided on an outer peripheral surface thereof with a position-control projection 21f, while the CCD frame 11 is provided on a front surface thereof with a position-control cam bar (an element of a removing device/a cam projection) 11a which extends forward. The position-control cam bar 11a is engaged with the position-control projection 21f to control the position of the rotatable lens frame 21. The position-control cam bar 11a projects forward from a base 11b of the CCD frame 11 to extend parallel to the rotational axis Z2. The position-control cam bar 11a is provided along an inner side edge thereof with an removed-position holding surface 11a1 which extends parallel to the rotational axis Z2, and is further provided at a front end of the position-control cam bar 11a with a cam surface 11a2 which is inclined rearwards, toward the base 11b, from an outer side edge 11a3 to the removed-position holding surface 11a1. In a state where the position-control projection 21f of the rotatable lens frame 21 is engaged with the removed-position holding surface 11a1, the second lens group L2 is positioned in the removed position, which is eccentric, away from the common optical axis Z1. In this state, immediately after the rotatable lens frame 21 moves forward along the rotational axis Z2 to a point where the position-control projection 21f is engaged with the cam surface 11a2, the rotatable lens frame 21 commences to rotate about the eccentric pivot 20c by the spring force of the torsion coil spring 24 in a direction to move the second lens group L2, which is held by the cylindrical lens holder portion 21a, onto the common optical axis Z1. A further forward movement of the position-control projection 21f beyond the front end (the cam surface 11a2) of the position-control cam bar 11a causes the position-control projection 21f to be disengaged from the position-control cam bar 11a as shown in FIG. 8A, thus causing the rotatable lens frame 21 to become free from the position-control cam bar 11a, so that the cylindrical lens holder portion 21a (the second lens group L2) moves onto the common optical axis Z1 by the spring force of the torsion coil spring 24. The position of the cylindrical lens holder portion 21a at this time, when the second lens group L2 is moved onto the common optical axis Z1 by the spring force of the torsion coil spring 24, is defined by the engagement of the stop protrusion 20d with the engaging protrusion 21d. At this time, the optical axis of the second lens group L2 is coincident with the common optical axis Z1. When the second lens group L2 is in the photographing position on the common optical axis Z1 in a ready-to-photograph state, the position-control projection 21f remains disengaged from the cam surface 11a2, and positioned in front of the cam surface 11a2. Conversely, if the rotatable lens frame 21 moves rearward along the rotational axis Z2 from a state where the second lens group L2 is in the photographing position on the common optical axis Z1, firstly the position-control projection 21f is engaged with the cam surface 11a2 and subsequently the rotatable lens frame 21 rotates about the eccentric pivot 20c against the spring force of the torsion coil spring 24 so that the second lens group L2 moves to a position (removed position) on the eccentric optical axis Z1' from a position on the common optical axis Z1 by engagement of the position-control projection 21f with the cam surface 11a2. A further rearward movement of the second lens group support frame 20 causes the position-control projection 21f to be engaged with the removed-position holding surface 11a1 so that the second lens group L2 is held in the removed position on the eccentric optical axis Z1'. In this state where the second lens group L2 is in the removed position on the eccentric optical axis Z1', the outer cylindrical wall of the cylindrical lens holder portion 21a is partly positioned in the cutaway portion 20h, but does not project radially outwards from the second lens group support frame 20 so as not to interfere with the cam ring 18 that is positioned radially outside the second lens group support frame 20. At this time, the eccentric optical axis Z1' is positioned within the second lens group support frame 20 (and also within the inner periphery of the cam ring 18 and the linear guide ring 19).

The position-control cam bar 11a is provided at the rear end of the removed-position holding surface 11a1 in the optical axis direction with a stepped portion (a second rearward movement limit device) 11a4. When the retractable zoom lens 10 is retracted from a ready-to-photograph state, a rearward movement of the rotatable lens frame 21 together with the second lens group support frame 20 causes the position-control projection 21f to come into contact with the stepped portion 11a4 to prevent the rotatable lens frame 21 from moving further rearward. As described above, the forward/rearward moving operation of the second lens group support frame 20 in the direction of the rotational axis Z2

(the optical axis direction) is controlled by the contours of the set of cam grooves 18c of the cam ring 18 and the forward/rearward movement of the cam ring 18 itself. The range of the forward/rearward movement of the second lens group support frame 20 is determined to make the second lens group support frame 20 continue to move rearward by a predetermined amount of movement relative to the rotatable lens frame 21 even after the rotatable lens frame 21 is prevented from moving rearward by the stepped portion 11a4.

Operations of the retractable zoom lens 10 having the above described structure will be hereinafter discussed. When the retractable zoom lens 10 is in the fully retracted position as shown in FIGS. 2 and 3B, the outer linear barrel 16, the inner linear barrels 17, the cam ring 18, and the linear guide ring 19 are all fully accommodated in the opening 13a of the front exterior frame 13. In this state, immediately after a main switch MS (see FIG. 1) of the digital camera 5 is turned ON, the rotatable ring 14 is driven to rotate in a predetermined rotational direction by forward rotation of the pinion 15 to extend the outer and inner linear barrels 16 and 17 forward from the opening 13a by a predetermined angle of rotation so that the retractable zoom lens 10 changes from the fully retracted state to a ready-to-photograph state at the, e.g., wide-angle extremity. The rotation of the rotatable ring 14 is transferred to the cam ring 18 to cause the cam ring 18 to advance to the most extended position thereof by engagement of the set of follower pins 18b with the set of cam through slots 12c. In the process of this forward movement of the cam ring 18 to the frontmost position thereof, the outer linear barrel 16, the inner linear barrels 17, the cam ring 18 and the linear guide ring 19 extend forward from the opening 13a. Subsequently, the linear guide ring 19 and the outer linear barrel 16 linearly move forward together with the cam ring 18 while each of the inner linear barrel 17 and the second lens group support frame 20 advances toward a ready-to-photograph position thereof at the wide-angle extremity. Thereafter, when the second lens group support frame 20 advances to the ready-to-photograph position thereof at the wide-angle extremity, the position-control projection 21f advances while sliding on the removed-position holding surface 11a1 to move from the removed-position holding surface 11a1 to the cam surface 11a2 to be engaged with the cam surface 11a2. Immediately after the position-control projection 21f moves to the cam surface 11a2 from the removed-position holding surface 11a1, the rotatable lens frame 21 rotates about the eccentric pivot 20c by the spring force of the torsion coil spring 24 in a direction to move the cylindrical lens holder portion 21a (the second lens group L2) onto the common optical axis Z1, and subsequently the rotatable lens frame 21 is prevented from further rotating in the same direction upon reaching a point at which the engaging protrusion 21d abuts against the stop protrusion 20d, whereat the optical axis of the second lens group L2 coincides with the common optical axis Z1. This state where the engaging protrusion 21d is engaged with the stop protrusion 20d is a ready-to-photograph state at the wide-angle extremity as shown in FIGS. 1 and 3A.

Figure 11A:
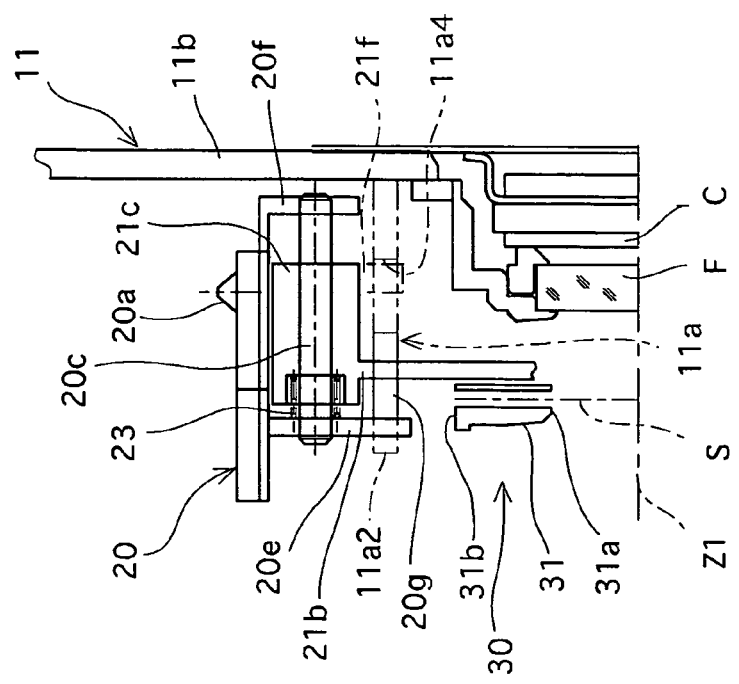
FIG. 11A is a longitudinal cross-sectional view of elements of the retractable zoom lens shown in FIG. 1 in a ready-to-photograph state, showing a relative operating status of the second lens group support frame and the rotatable lens frame.

In this ready-to-photograph state, the compression coil spring 23 presses the rotatable lens frame 21 rearward to bring the rear end of the cylindrical swing portion 21c into pressing contact with the rear shaft support member 20f as shown in FIG. 11A. Accordingly, a front surface (left surface as viewed in FIG. 11A) of the rear shaft support member 20f serves as a reference surface for determining the position (the limit of rearward movement) of the rotatable lens frame 21 with respect to the second lens group support frame 20 in a ready-to-photograph state. In addition, the end (right end as viewed in FIG. 1) of the forward-movement limit projection 20g faces the swing arm 21b in the close vicinity thereof (see FIGS. 1, 5A, 10A and 11A) to prevent the rotatable lens frame 21 from moving forward relative to the second lens group support frame 20 therein against the spring force of the compression coil spring 23.

In this ready-to-photograph state, if a zoom switch ZS (see FIG. 1) of the digital camera 5 is manually operated to drive the pinion 15, the cam ring 18 rotates about the rotational axis Z2 at a fixed position without moving along the rotational axis Z2 (i.e., along the common optical axis Z1). This rotation of the cam ring 18 causes the second lens group support frame 20 and the inner linear barrel 17 to move along the rotational axis Z2 (i.e., along the common optical axis Z1) in a predetermined moving manner in accordance with the contours of the set of cam grooves 18c and the contours of the set of cam grooves 18d, respectively. Since the second lens group support frame 20 carries the rotatable lens frame 21 while the first lens group L1 is supported by the inner linear barrel 17, a zooming operation is performed by movements of the first and second lens groups L1 and L2 along the common optical axis Z1. Even if a zooming operation is carried out, the rear end of the cylindrical swing portion 21c remains in contact with the rear shaft support member 20f by the spring force of the compression coil spring 23 (at the same time the cylindrical swing portion 21c is prevented from moving forward relative to the second lens group support frame 20 by the forward-movement limit projection 20g), so that the relative position between the second lens group support frame 20 and the rotatable lens frame 21 does not change in the optical axis direction. Namely, in a ready-to-photograph state, the shutter (diaphragm) S and the second lens group L2, which are two optical elements which are adjacent to each other in the optical axis direction and supported by the second lens group support frame 20 therein, move as one body in the optical axis direction without changing the distance therebetween. A focusing operation is performed by driving the third lens group L3 along the common optical axis Z1 in accordance with information on an object distance.

Immediately after the main switch MS of the digital camera 5 is turned OFF, the pinion 15 is driven reverse to move the cam ring 18 rearward beyond the wide-angle extremity position thereof. In the process of this rearward movement of the cam ring 18, the second lens group support frame 20 and the inner linear barrel 17 move rearward due to engagement of the set of cam grooves 18c with the set of follower projections 20a and engagement of the set of cam grooves 18d with the set of follower pins 17a. The rearward movement of the second lens group support frame 20 firstly causes the position-control projection 21f of the rotatable lens frame 21 to come into contact with the cam surface 11a2 of the position-control cam bar 11a, and subsequently causes the rotatable lens frame 21 to rotate about the eccentric pivot 20c by engagement of the position-control projection 21f with the cam surface 11a2 so that the second lens group L2 withdraws from the common optical axis Z1. Upon the position-control projection 21f being engaged with the removed-position holding surface 11a1, the second lens group L2 is held in the removed position. As shown in FIG. 11A, although the rear end of the cylindrical swing portion 21c is in contact with the rear shaft support member 20f with a gap between the cylindrical swing portion 21c and the front shaft support member 20e, the swing arm 21b of the rotatable lens frame 21 is prevented from moving forward relative to the second lens group support frame 20 by the forward-movement limit projection 20g. This positional relationship between the swing arm 21b and the forward-movement limit projection 20g is maintained even when the retractable zoom lens 10 is fully retracted from a ready-to-photograph state. Accordingly, when the cam surface 11a2 of the position-control cam bar 11a presses the position-control projection 21f of the rotatable lens frame 21 from behind, the rotatable lens frame 21 is prevented from sliding forward on the eccentric pivot 20c by the pressure of the cam surface 11a2 against the position-control projection 21f. This makes it possible to have the rotatable lens frame 21 rotate to a position at which the second lens group L2 is positioned on the eccentric optical axis Z1' in an early stage in the retracting operation of the retractable zoom lens 10 without an opposing force exerted on the rotatable lens frame 21 in a forward direction opposite to the retracting movement direction along the optical axis direction.

Subsequently, the cam ring 18 further moves rearward after the second lens group L2 has removed to be positioned on the eccentric optical axis Z1', while the inner linear barrel 17, which supports the first lens group L1, moves rearward due to the engagement of the set of cam grooves 18d with the set of follower pins 17a. At the same time, the second lens group support frame 20 moves rearward due to engagement of the set of cam grooves 18c with the set of follower pins 20a, while the position-control projection 21f moves rearward while maintaining the engagement with the removed-position holding surface 11a1 (i.e., while holding the second lens group L2 on the eccentric optical axis Z1'). The rotation of the rotatable lens frame 21 about the eccentric pivot 20c to the removed position (eccentric position) as shown in FIG. 5B causes the swing arm 21b to move away from a rearward extension of the forward-movement limit projection 20g, thus making it possible for the rotatable lens frame 21 to move forward in the optical axis direction relative to the second lens group support frame 20 therein. However, during the time the position-control projection 21f slides on the removed-position holding surface 11a1 that is elongated in the optical axis direction, no force which presses the rotatable lens frame 21 forward is produced, so that the rotatable lens frame 21 moves rearward together with the second lens group support frame 20 in the optical axis direction.

Figure 10A:
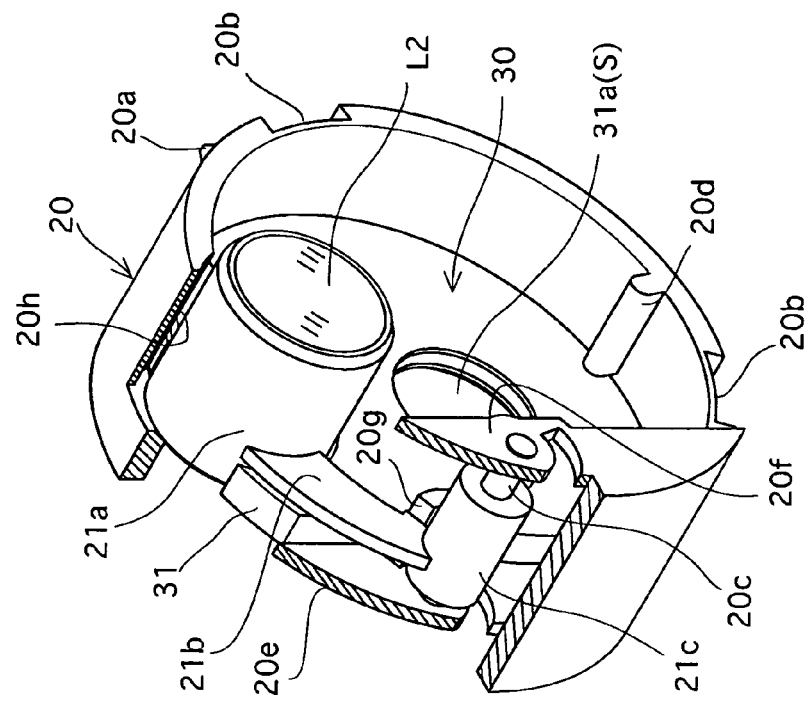
FIG. 10A is a perspective view of elements of the retractable zoom lens shown in FIG. 1, showing a structure supporting a retractable lens group frame on the second lens group support frame, as viewed obliquely from behind in the optical axis direction of the retractable zoom lens.
Figure 10B:
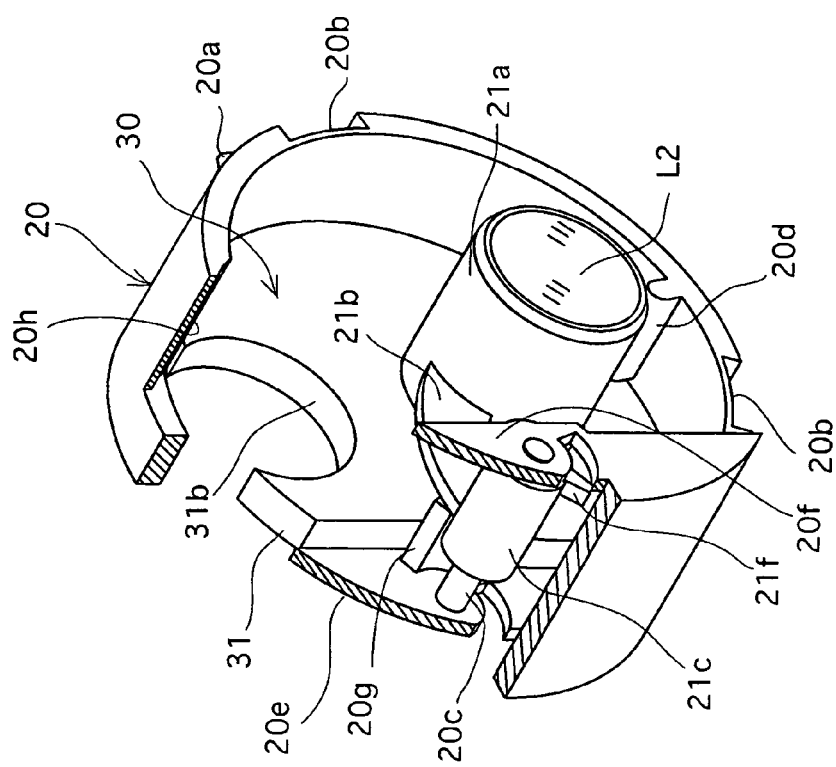
FIG. 10B is a view similar to that of FIG. 10A, showing the same supporting structure in a different state.
Figure 11B:
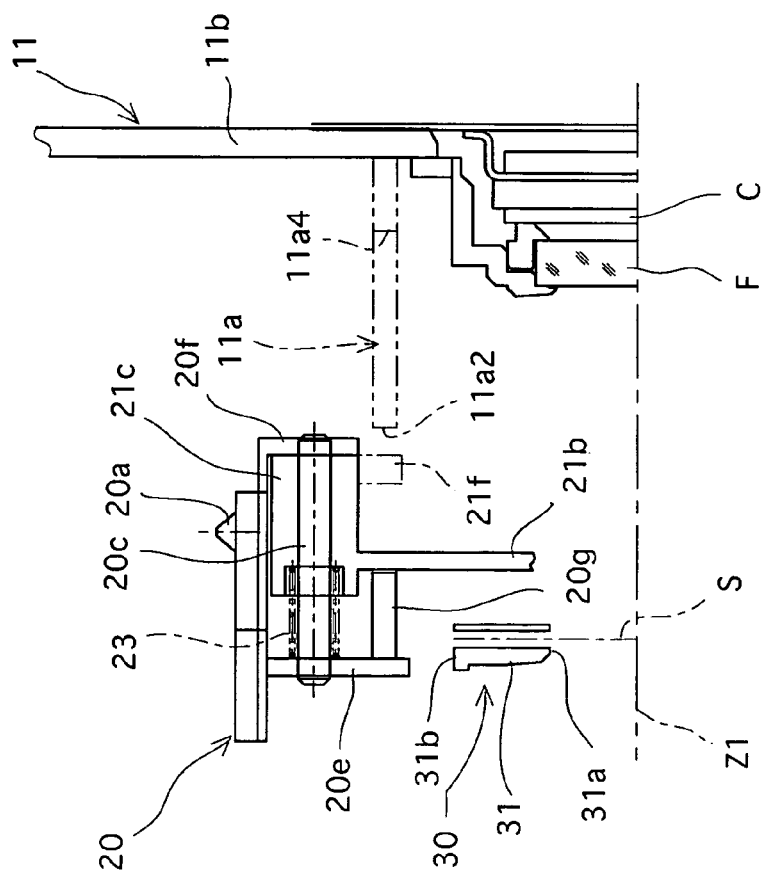
FIG. 11B is a view similar to that of FIG. 11A in a fully retracted state, showing a relative operating status of the second lens group support frame and the rotatable lens frame.

Thereafter, a further rearward movement of the position-control projection 21f by a certain amount causes the position-control projection 21f to come in contact with the stepped portion 11a4 to prevent a further rearward movement of the rotatable lens frame 21. On the other hand, the second lens group support frame 20 continues to be moved rearward by control of the cam ring 18 even after the rotatable lens frame 21 is prevented from moving rearward as described above. Thereupon, the front shaft support member 20e approaches the front end of the cylindrical swing portion 21c as shown in FIG. 11B while compressing the compression coil spring 23 so that the position of the rotatable lens frame 21 in the optical axis direction in the second lens group support frame 20 changes from the position of the same in a ready-to-photograph position (in practice, the second lens group support frame 20 moves rearward relative to the rotatable lens frame 21 which is standing still). As a result, the distance between the second lens group L2 that is held by the rotatable lens frame 21 and the shutter (diaphragm) S that is held by the second lens group support frame 20 in the optical axis direction becomes smaller than in a ready-to-photograph state, and in the fully retracted state shown in FIGS. 2 and 3B the second lens group support frame 20 is retracted up to a point at which a front portion of the second lens group L2 (the cylindrical lens holder portion 21a) is positioned radially outside of the shutter (diaphragm) S (the shutter unit 30) in a radial direction of the common optical axis Z1, i.e., at which a front portion of the second lens group L2 is positioned in a plane perpendicular to the common optical axis Z1 in which the shutter (diaphragm) S lies. At this time, the rotatable lens frame 21 and the shutter unit 30 do not interfere with each other since the front end of the cylindrical lens holder portion 21a enters the opening 31b as shown in FIGS. 5B, 6B and 10B.

As can be seen from the above description, the retractable zoom lens 10 that is incorporated in the digital camera 5 is constructed so that not only the second lens group L2 is retracted radially outwards and rearwards when the retractable zoom lens 10 is fully retracted from a ready-to-photograph state, but also the amount of rearward movement of the second lens group support frame 20, which moves together with the second lens group L2 as one body during a zooming operation in a ready-to-photograph state, becomes greater than the amount of rearward movement of the second lens group L2 (the rotatable lens frame 21) when the retractable zoom lens 10 is fully retracted from a ready-to-photograph state. This differential movement makes a further retraction of the second lens group support frame 20 possible, thus making a further reduction of the length of the retractable zoom lens 10 possible when the retractable zoom lens 10 is fully retracted. The above illustrated embodiment of the retractable zoom lens 10, in particular, is suitable for achieving a substantial reduction in length of the retractable zoom lens 10 because the second lens group L2 and the shutter (diaphragm) S, which are two optical elements that are adjacent to each other in the optical axis direction and supported by the second lens group support frame 20 therein, move as one body in the optical axis direction without changing the distance therebetween in a ready-to-photograph state and because the second lens group L2 and the shutter (diaphragm) S are accommodated so as to overlap in the same positional range in the optical axis direction.

The above illustrated embodiment of the digital camera 5 and the retractable zoom lens 10 that is incorporated in the digital camera 5 are preferred embodiments of the present invention, and therefore the present invention is not limited solely to these particular embodiments.

For example, although only the second lens group L2 is retracted radially outwards from the common optical axis Z1 when the retractable zoom lens 10 is fully retracted, more than one optical element including the second lens group L2 can be retracted radially outwards from the common optical axis Z1 when the retractable zoom lens 10 is fully retracted.

Although the second lens group L2 rotates about the eccentric pivot 20c to move between the operating position on the common optical axis Z1 and the removed position on the eccentric optical axis Z1' in the above illustrated embodiment of the retractable zoom lens 10, the method of removing (radially moving) the second lens group L2 from the common optical axis Z1 is not limited solely to that of the above illustrated embodiment. For instance, it is possible to remove the second lens group L2 (or any other optical element or elements) from the common optical axis Z1 by linearly moving the second lens group L2.

Although the second lens group L2 is removed radially outwards from the common optical axis Z1 to be positioned above the common optical axis Z1 when the retractable zoom lens 10 is fully retracted in the above illustrated embodiment of the retractable zoom lens, the radial direction of movement of the second lens group L2 when removed from the common optical axis Z1 can be in any desirable direction.

Although the compression coil spring 23 is used as a biasing member for biasing the rotatable lens frame 21 in the above illustrated embodiment of the retractable zoom lens, it is possible to use a tension spring such as a wave washer or a leaf spring instead of the compression coil spring 23 to bias the rotatable lens frame 21. However, in the structure of a lens barrel such as the structure of the above described embodiment of the retractable zoom lens, a compression coil spring can be used as a smallest biasing member for biasing the rotatable lens frame 21, and is therefore a most desirable biasing member for biasing the rotatable lens frame 21.

Although the optical element among the optical elements of the photographing optical system which is removed from a position on the optical axis thereof is a lens group (the second lens group L2) in the above illustrated embodiment of the retractable zoom lens, one or more of any other optical element such as the low-pass filter F can constitute the removable optical element(s) in the same manner as the second lens group L2.

Although the above illustrated embodiment of the retractable lens system is a zoom lens, the present invention can also be applied to any other type of retractable lens, e.g., a retractable type fixed-focal-length lens if the operations (zooming operations) of the second lens group L2 and the shutter (diaphragm) S which are performed during picture taking are replaced by focusing operations.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A retractable lens system comprising a plurality of optical elements of a photographing optical system,
    all of said plurality of optical elements being positioned on a common optical axis when said retractable lens system is in a ready-to-photograph state,
    when said retractable lens system changes from said ready-to-photograph state to a retracted state, at least one removable optical element of said plurality of optical elements is moved to a removed position outside of said common optical axis, and said removable optical element and at least one optical element of the remaining optical elements of said plurality of optical elements are moved rearward,
    said at least one optical element of said remaining optical elements including a linearly movable element which moves in said common optical axis direction without changing a distance between said linearly movable element and said removable optical element in said common optical axis direction when said retractable lens system is in said ready-to-photograph state, and
    at least a part of said removable optical element and at least a part of said linearly movable element being positioned to lie in a common plane perpendicular to said common optical axis when said retractable lens system changes from said ready-to-photograph state to said retracted state.

2. The retractable lens system according to claim 1, further comprising:
    a movable ring which supports said linearly movable element and said removable optical element in a manner such that said linearly movable element and said removable optical element integrally move in said common optical axis direction when said retractable lens system is in said ready-to-photograph state, and which moves rearward when said retractable lens system changes from said ready-to-photograph state to said retracted state; and
    a position control mechanism for supporting said removable optical element in said movable ring so that said removable optical element is movable both in a plane perpendicular to said common optical axis and in said common optical axis direction, and for positioning said removable optical element behind said linearly movable element when said retractable lens system is in said ready-to-photograph state.

3. The retractable lens system according to claim 1, wherein said linearly movable element comprises an exposure control member including at least one of a shutter and a diaphragm.

4. The retractable lens system according to claim 2, wherein said position control mechanism comprises:
    a rotational shaft extending parallel to said common optical axis, and provided inside of said movable ring to be eccentric from said common optical axis;
    a holder frame which holds said removable optical element and is engaged with said rotational shaft to be rotatable on said rotational shaft and movable in said common optical axis direction;
    a biasing member which biases said holder frame rearward in said common optical axis direction on said rotational shaft; and
    a rearward movement limit device which determines a limit of a rearward movement of said holder frame in said movable ring.

5. The retractable lens system according to claim 4, further comprising a second rearward movement limit device provided on a stationary member which is immovable in said common optical axis direction, and positioned behind said holder frame when said retractable lens system is in said ready-to-photograph state,
    wherein, when said retractable lens system changes from said ready-to-photograph state to said retracted state, said holder frame partly comes into contact with said second rearward movement limit device to be prevented from further moving rearward at a midpoint of said rearward movement of said movable ring, and subsequently said movable ring continues to move rearward against a biasing force of said biasing member.

6. The retractable lens system according to claim 4, wherein said biasing member comprises a compression coil spring.

7. The retractable lens system according to claim 4, further comprising:
    a removing device for removing said holder frame to said removed position by rotating said holder frame about said rotational shaft with aid of a rearward moving force of said movable ring and said holder frame when said retractable lens system changes from said ready-to-photograph state to said retracted state; and
    a forward movement limit device for preventing said holder frame from moving forward in said common optical axis direction relative to said movable ring during operation of said removing device.

8. The retractable lens system according to claim 7, wherein said removing device comprises a cam projection which projects forward in said common optical axis direction from a stationary member provided behind said movable ring, a cam surface contactable with said holder frame being formed at a front end of said cam projection.

9. The retractable lens system according to claim 2, further comprising at least one rear optical element which is positioned behind said removable optical element when said retractable lens system is in said ready-to-photograph state,
wherein at least a part of said rear optical element and at least a part of said removable optical element lie in a common plane perpendicular to said common optical axis when said retractable lens system is in said retracted state.

10. The retractable lens system according to claim 1, wherein said photographing optical system comprises a zoom lens system which consists of a plurality of lens groups including said removable optical element.

11. The retractable lens system according to claim 1, wherein said retractable lens system is incorporated in a camera.

12. The retractable lens system according to claim 11, wherein said retractable lens system changes from said ready-to-photograph state to said retracted state when a main switch of said camera is turned OFF.

13. The retractable lens system according to claim 11, wherein said removable optical element is one of said plurality of optical elements which is positioned between a frontmost optical element and a rearmost optical element of said plurality of optical elements.

14. The retractable lens system according to claim 13, wherein said removable optical element is positioned behind said linearly movable element adjacent thereto when said retractable lens system is in said ready-to-photograph state.

15. A retractable lens system comprising a plurality of optical elements of a photographing optical system,
all of said plurality of optical elements being positioned on a common optical axis when said retractable lens system is in a ready-to-photograph state,
when said retractable lens system changes from said ready-to-photograph state to a retracted state, at least one removable optical element of said plurality of optical elements is moved to a removed position outside of said common optical axis, and said removable optical element and at least one optical element of the remaining optical elements of said plurality of optical elements are moved rearward,
said retractable lens system including a movable ring which supports said removable optical element inside of said movable ring, and moves rearward when said retractable lens system changes from said ready-to-photograph state to said retracted state,
said movable ring and said removable optical element integrally moving in said common optical axis direction when said retractable lens system is in said ready-to-photograph state, and
the amount of rearward movement of said movable ring being greater than that of said removable optical element in said common optical axis direction when said retractable lens system changes from said ready-to-photograph state to said retracted state.

16. The retractable lens system according to claim 15, further comprising:
a linearly movable element which integrally moves together with said movable ring in said common optical axis direction when moving in said common optical axis direction, and is positioned in front of said removable optical element when said retractable lens system is in said ready-to-photograph state; and
a position control mechanism for positioning at least a part of said removable optical element and at least a part of said linearly movable element in a common plane perpendicular to said common optical axis when said retractable lens system changes from said ready-to-photograph state to said retracted state.

17. The retractable lens system according to claim 16, wherein said linearly movable element comprises an exposure control member including at least one of a shutter and a diaphragm.

18. The retractable lens system according to claim 16, wherein said position control mechanism comprises:
a rotational shaft extending parallel to said common optical axis, and provided inside of said movable ring to be eccentric from said common optical axis;
a holder frame which holds said removable optical element and is engaged with said rotational shaft to be rotatable on said rotational shaft and movable in said common optical axis direction;
a biasing member which biases said holder frame rearward in said common optical axis direction on said rotational shaft; and
a rearward movement limit device which determines a limit of a rearward movement of said holder frame in said movable ring.

19. The retractable lens system according to claim 18, further comprising a second rearward movement limit device provided on a stationary member which is immovable in said common optical axis direction, and positioned behind said holder frame when said retractable lens system is in said ready-to-photograph state,
wherein, when said retractable lens system changes from said ready-to-photograph state to said retracted state, said holder frame partly comes into contact with said second rearward movement limit device to be prevented from further moving rearward at a midpoint of said rearward movement of said movable ring, and subsequently said movable ring continues to move rearward against a biasing force of said biasing member.

20. The retractable lens system according to claim 18, wherein said biasing member comprises a compression coil spring.

21. The retractable lens system according to claim 18, further comprising:
a removing device for removing said holder frame to said removed position by rotating said holder frame about said rotational shaft with aid of a rearward moving force of said movable ring and said holder frame when said retractable lens system changes from said ready-to-photograph state to said retracted state; and
a forward movement limit device for preventing said holder frame from moving forward in said common optical axis direction relative to said movable ring during operation of said removing device.

22. The retractable lens system according to claim 21, wherein said removing device comprises a cam projection which projects forward in said common optical axis direction from a stationary member provided behind said movable ring, a cam surface contactable with said holder frame being formed at a front end of said cam projection.

23. The retractable lens system according to claim 16, further comprising at least one rear optical element which is positioned behind said removable optical element when said retractable lens system is in said ready-to-photograph state,
wherein at least a part of said rear optical element and at least a part of said removable optical element lie in a common plane perpendicular to said common optical axis when said retractable lens system is in said retracted state.

24. The retractable lens system according to claim 15, wherein said photographing optical system comprises a zoom lens system which consists of a plurality of lens groups including said removable optical element.

25. The retractable lens system according to claim 15, wherein said retractable lens system is incorporated in a camera.

26. A retractable lens system comprising:
linearly movable optical elements which are movable only linearly along a common optical axis; and
at least one removable optical element which is positioned on said common optical axis when said retractable lens system is in a ready-to-photograph state, and is moved to a removed position outside of said common optical axis when said retractable lens system changes from said ready-to-photograph state to a retracted state,
said linearly movable optical elements and said removable optical element being moved rearward when said retractable lens system changes from said ready-to-photograph state to said retracted state,
a forward optical element of said linearly movable optical elements being positioned immediately in front of said removable optical element when said retractable lens system is in said ready-to-photograph state, and
at least a part of said removable optical element and at least a part of said forward optical element of said linearly movable elements, which is positioned immediately in front of said removable optical element when said retractable lens system is in said ready-to-photograph state, lying in a common plane perpendicular to said common optical axis when said retractable lens system is in said retracted state.

27. The retractable lens system according to claim 26, further comprising:
a movable ring which supports said removable optical element and said forward optical element of said linearly movable elements in a manner so that said removable optical element and said one of said linearly movable elements integrally move in said common optical axis direction when said retractable lens system is in said ready-to-photograph state, and which moves rearward at least when said retractable lens system changes from said ready-to-photograph state to said retracted state; and
a position control mechanism for supporting said removable optical element in said movable ring so that said removable optical element is movable both in a plane perpendicular to said common optical axis and in said common optical axis direction, and for positioning said removable optical element behind said forward optical element said linearly movable elements when said retractable lens system is in said ready-to-photograph state.

28. The retractable lens system according to claim 26, wherein said forward optical element of said linearly movable elements comprises an exposure control member including at least one of a shutter and a diaphragm.

29. The retractable lens system according to claim 27, wherein said position control mechanism comprises:
a rotational shaft extending parallel to said common optical axis, and provided inside of said movable ring to be eccentric from said common optical axis;
a holder frame which holds said removable optical element and is engaged with said rotational shaft to be rotatable on said rotational shaft and movable in said common optical axis direction;
a biasing member which biases said holder frame rearward in said common optical axis direction on said rotational shaft; and
a rearward movement limit device which determines a limit of a rearward movement of said holder frame in said movable ring.

30. The retractable lens system according to claim 29, further comprising a second rearward movement limit device provided on a stationary member which is immovable in said common optical axis direction, and positioned behind said holder frame when said retractable lens system is in said ready-to-photograph state,
wherein, when said retractable lens system changes from said ready-to-photograph state to said retracted state, said holder frame partly comes into contact with said second rearward movement limit device to be prevented from further moving rearward at a midpoint of said rearward movement of said movable ring, and subsequently said movable ring continues to move rearward against a biasing force of said biasing member.

31. The retractable lens system according to claim 29, wherein said biasing member comprises a compression coil spring.

32. The retractable lens system according to claim 29, further comprising:
a removing device for removing said holder frame to said removed position by rotating said holder frame about said rotational shaft with aid of a rearward moving force of said movable ring and said holder frame when said retractable lens system changes from said ready-to-photograph state to said retracted state; and
a forward movement limit device for preventing said holder frame from moving forward in said common optical axis direction relative to said movable ring during operation of said removing device.

33. The retractable lens system according to claim 32, wherein said removing device comprises a cam projection which projects forward in said common optical axis direction from a stationary member provided behind said movable ring, a cam surface contactable with said holder frame being formed at a front end of said cam projection.

34. The retractable lens system according to claim 27, further comprising at least one rear optical element which is positioned behind said removable optical element when said retractable lens system is in said ready-to-photograph state,
wherein at least a part of said rear optical element and at least a part of said removable optical element lie in a common plane perpendicular to said common optical axis when said retractable lens system is in said retracted state.

35. The retractable lens system according to claim 26, wherein said photographing optical system comprises a zoom lens system which consists of a plurality of lens groups including said removable optical element.

36. The retractable lens system according to claim 26, wherein said retractable lens system is incorporated in a camera.

37. A retractable lens system comprising:
an exposure control member including at least one of a shutter and a diaphragm; and
a plurality of optical elements excluding said exposure control member, said exposure control member and said plurality of optical elements being positioned on a common optical axis when said retractable lens system is in a ready-to-photograph state, when said retractable lens system changes from said ready-to-photograph state to a retracted state, at least one removable optical element of said plurality of optical elements is moved to a removed position outside of said common optical axis, and said removable optical element and said exposure control member are moved rearward, said removable optical element being positioned behind said exposure control member when said retractable lens system is in said ready-to-photograph state, and said exposure control member and at least a part of said removable optical element lying in a common plane perpendicular to said common optical axis when said retractable lens system is in said retracted state.

38. The retractable lens system according to claim 37, further comprising:

a movable ring which supports said exposure control member and said removable optical element in a manner such that said exposure control member and said removable optical element integrally move in said common optical axis direction when said retractable lens system is in said ready-to-photograph state, and which moves rearward when said retractable lens system changes from said ready-to-photograph state to said retracted state; and a position control mechanism for supporting said removable optical element in said movable ring so that said removable optical element is movable both in a plane perpendicular to said common optical axis and in said common optical axis direction, and for positioning said removable optical element behind said exposure control member when said retractable lens system is in said ready-to-photograph state.

39. The retractable lens system according to claim 38, wherein said position control mechanism comprises:

a rotational shaft extending parallel to said common optical axis, and provided inside of said movable ring to be eccentric from said common optical axis;

a holder frame which holds said removable optical element and is engaged with said rotational shaft to be rotatable on said rotational shaft and movable in said common optical axis direction;

a biasing member which biases said holder frame rearward in said common optical axis direction on said rotational shaft; and a rearward movement limit device which determines a limit of a rearward movement of said holder frame in said movable ring.

40. The retractable lens system according to claim 39, further comprising a second rearward movement limit device provided on a stationary member which is immovable in said common optical axis direction, and positioned behind said holder frame when said retractable lens system is in said ready-to-photograph state, wherein, when said retractable lens system changes from said ready-to-photograph state to said retracted state, said holder frame partly comes into contact with said second rearward movement limit device to be prevented from further moving rearward at a midpoint of said rearward movement of said movable ring, and subsequently said movable ring continues to move rearward against a biasing force of said biasing member.

41. The retractable lens system according to claim 39, wherein said biasing member comprises a compression coil spring.

42. The retractable lens system according to claim 39, further comprising:

a removing device for removing said holder frame to said removed position by rotating said holder frame about said rotational shaft with aid of a rearward moving force of said movable ring and said holder frame when said retractable lens system changes from said ready-to-photograph state to said retracted state; and a forward movement limit device for preventing said holder frame from moving forward in said common optical axis direction relative to said movable ring during operation of said removing device.

43. The retractable lens system according to claim 42, wherein said removing device comprises a cam projection which projects forward in said common optical axis direction from a stationary member provided behind said movable ring, a cam surface contactable with said holder frame being formed at a front end of said cam projection.

44. The retractable lens system according to claim 38, further comprising at least one rear optical element which is positioned behind said removable optical element when said retractable lens system is in said ready-to-photograph state, wherein at least a part of said rear optical element and at least a part of said removable optical element lie in a common plane perpendicular to said common optical axis when said retractable lens system is in said retracted state.

45. The retractable lens system according to claim 37, wherein said photographing optical system comprises a zoom lens system which consists of a plurality of lens groups including said removable optical element.

46. The retractable lens system according to claim 37, wherein said retractable lens system is incorporated in a camera.

47. A digital camera comprising:

a body;

a retractable lens system disposed within the body and comprising a plurality of optical elements of a photographing optical system; and an image pick-up device disposed within said body and configured to pick up an image formed by said plurality of optical elements;

all of said plurality of optical elements being positioned along a common optical axis when said retractable lens system is in a ready-to-photograph state, when said retractable lens system changes from said ready-to-photograph state to a retracted state, at least one removable optical element of said plurality of optical elements is moved to a removed position outside of said common optical axis, and said removable optical element and at least one optical element of the remaining optical elements of said plurality of optical elements are moved toward said image pick-up device, said at least one optical element of said remaining optical elements including a linearly movable element which moves in said common optical axis direction without changing a distance between said linearly movable element and said removable optical element in said common optical axis direction when said retractable lens system is in said ready-to-photograph state, and at least a part of said removable optical element and at least a part of said linearly movable element being positioned to lie along a common plane generally perpendicular to said common optical axis when said retractable lens system changes from said ready-to-photograph state to said retracted state.

48. The digital camera according to claim 47, further comprising:
a movable ring configured to support said linearly movable element and said removable optical element such that said linearly movable element and said removable optical element move together in the common optical axis direction when said retractable lens system is in said ready-to-photograph state, and which moves toward said image pick-up device when said retractable lens system changes from said ready-to-photograph state to said retracted state; and
a position control mechanism for supporting said removable optical element in said movable ring so that said removable optical element is movable both in a plane perpendicular to said common optical axis and in said common optical axis direction, and for positioning said removable optical element behind said linearly movable element when said retractable lens system is in said ready-to-photograph state.

49. The digital camera according to claim 47, wherein said linearly movable element comprises an exposure control member including at least one of a shutter or a diaphragm.

50. The digital camera according to claim 48, wherein said position control mechanism comprises:
a rotational shaft extending parallel to said common optical axis, and provided inside of said movable ring to be eccentric from said common optical axis;
a holder frame which holds said removable optical element and is engaged with said rotational shaft to be rotatable on said rotational shaft and movable in said common optical axis direction;
a biasing member which biases said holder frame rearward in said common optical axis direction on said rotational shaft; and
a rearward movement limit device which determines a limit of a rearward movement of said holder frame in said movable ring.

51. The digital camera according to claim 50, further comprising a second rearward movement limit device provided on a stationary member which is immovable in said common optical axis direction, and positioned behind said holder frame when said retractable lens system is in said ready-to-photograph state,
wherein, when said retractable lens system changes from said ready-to-photograph state to said retracted state, at least a portion of said holder frame comes into contact with said second rearward movement limit device to be prevented from further moving rearward at a midpoint of said rearward movement of said movable ring, and subsequently said movable ring continues to move rearward against a biasing force of said biasing member.

52. The digital camera according to claim 50, wherein said biasing member comprises a compression coil spring.

53. The digital camera according to claim 50, further comprising:
a removing device for removing said holder frame to said removed position by rotating said holder frame about said rotational shaft with aid of a rearward moving force of said movable ring and said holder frame when said retractable lens system changes from said ready-to-photograph state to said retracted state; and
a forward movement limit device for preventing said holder frame from moving forward in said common optical axis direction relative to said movable ring during operation of said removing device.

54. The digital camera according to claim 53, wherein said removing device comprises a cam projection which projects forward in said common optical axis direction from a stationary member provided behind said movable ring, a cam surface contactable with said holder frame being formed at a front end of said cam projection.

55. The digital camera according to claim 48, wherein said retractable lens system further comprises at least one rear optical element which is positioned behind said removable optical element when said retractable lens system is in said ready-to-photograph state, wherein at least a part of said rear optical element and at least a part of said removable optical element lie along a common plane generally perpendicular to said common optical axis when said retractable lens system is in the retracted state.

56. The digital camera according to claim 47, wherein said photographing optical system comprises a zoom lens system including a plurality of lens groups including said removable optical element.

57. The digital camera according to claim 47, wherein said retractable lens system changes from said ready-to-photograph state to said retracted state when a main switch of the camera is turned OFF.

58. The digital camera according to claim 47, wherein said removable optical element is one of said plurality of optical elements which is positioned between a frontmost optical element and a rearmost optical element of said plurality of optical elements.

59. The digital camera according to claim 58, wherein said removable optical element is positioned behind said linearly movable element adjacent thereto when said retractable lens system is in said ready-to-photograph state.

60. The digital camera according to claim 47, wherein said image pick-up device is a CCD image sensor or a CMOS image sensor.

* * * * *